(12) United States Patent
Szente et al.

(10) Patent No.: US 11,318,909 B2
(45) Date of Patent: *May 3, 2022

(54) ACTUATED MECHANISM FOR ACTIVE PEDESTRIAN SAFETY LATCH

(71) Applicant: MAGNA CLOSURES INC., Newmarket (CA)

(72) Inventors: Csaba Szente, Newmarket (CA); John Distefano, Richmond Hill (CA); Ioan Dorin Ilea, Vaughan (CA)

(*) Notice: Subject to any disclaimer, the term of this patent is extended or adjusted under 35 U.S.C. 154(b) by 226 days.

This patent is subject to a terminal disclaimer.

(21) Appl. No.: 16/261,039

(22) Filed: Jan. 29, 2019

(65) Prior Publication Data
US 2019/0232915 A1 Aug. 1, 2019

Related U.S. Application Data

(60) Provisional application No. 62/667,172, filed on May 4, 2018, provisional application No. 62/623,126, filed on Jan. 29, 2018.

(51) Int. Cl.
*B60R 21/38* (2011.01)
*B62D 25/10* (2006.01)
(Continued)

(52) U.S. Cl.
CPC ............ *B60R 21/38* (2013.01); *B62D 25/105* (2013.01); *B62D 25/12* (2013.01); *E05B 83/24* (2013.01); *B60R 2021/0004* (2013.01)

(58) Field of Classification Search
CPC . B60R 21/38; B60R 2021/004; B62D 25/105; B62D 25/12; E05B 77/08; E05B 77/12; E05B 83/24; E05B 79/02
See application file for complete search history.

(56) References Cited

U.S. PATENT DOCUMENTS 4,456,289 A * 6/1984 Badiali .................. E05B 83/24
292/125
4,746,153 A * 5/1988 Compeau ................ E05B 81/22
292/216

(Continued)

FOREIGN PATENT DOCUMENTS

CN 102416983 A 4/2012
CN 102806946 A 12/2012
(Continued)

*Primary Examiner* — Paul N Dickson
*Assistant Examiner* — Timothy Wilhelm

(57) ABSTRACT

A latch travel mechanism for a closure panel of a vehicle, the mechanism comprising: a mounting plate for mounting a latch, the latch for retaining the closure panel in a closed position with respect to a body of the vehicle; a support plate coupled to the mounting plate, the support plate for connecting to a body of the vehicle; one or more linkages connected to the support plate at one end and connected to the mounting plate at another end, the one or more linkages providing said coupled to the mounting plate; a locking member mounted on the support plate and configured for retaining the mounting plate in a home position when coupled to the mounting plate and for decoupling from the mounting plate when operated; an actuation system coupled to the linkages for extending the linkages once the locking member is decoupled from the mounting plate, in order to move the mounting plate relative to the support plate from the home position to an extended position; wherein the latch is also moved from the home position to the extended position when mounted on the mounting plate.

18 Claims, 25 Drawing Sheets

(51) Int. Cl.
  *B62D 25/12* (2006.01)
  *E05B 83/24* (2014.01)
  *B60R 21/00* (2006.01)

(56) References Cited

U.S. PATENT DOCUMENTS

| | | | | |
|---|---|---|---|---|
| 4,991,884 | A * | 2/1991 | Cairns | E05B 83/24 |
| | | | | 292/28 |
| 5,000,493 | A * | 3/1991 | Bastien | E05B 83/24 |
| | | | | 292/11 |
| 5,141,265 | A * | 8/1992 | Claar | E05B 83/24 |
| | | | | 292/100 |
| 5,222,775 | A * | 6/1993 | Kato | E05B 81/14 |
| | | | | 292/201 |
| 5,273,325 | A | 12/1993 | Zimmermann | |
| 5,411,302 | A * | 5/1995 | Shimada | E05B 81/14 |
| | | | | 292/201 |
| 5,429,400 | A * | 7/1995 | Kawaguchi | E05B 81/22 |
| | | | | 292/201 |
| 5,445,421 | A * | 8/1995 | Ferrara | E05B 83/24 |
| | | | | 292/216 |
| 6,364,402 | B1 | 4/2002 | Sasaki | |
| 6,837,535 | B2 * | 1/2005 | Plesternings | B60J 7/143 |
| | | | | 296/107.17 |
| 7,195,090 | B2 * | 3/2007 | Parks | B60R 21/38 |
| | | | | 180/271 |
| 7,303,040 | B2 * | 12/2007 | Green | B60R 21/38 |
| | | | | 180/274 |
| 7,559,399 | B2 * | 7/2009 | Lewis | B60R 21/38 |
| | | | | 180/274 |
| 7,766,397 | B2 * | 8/2010 | Carabalona | E05B 81/14 |
| | | | | 292/201 |
| 8,235,428 | B2 | 8/2012 | Hunt et al. | |
| 8,573,658 | B2 | 11/2013 | Kim | |
| 8,579,068 | B2 * | 11/2013 | Farooq | E05B 77/08 |
| | | | | 180/274 |
| 8,584,787 | B2 * | 11/2013 | Hwang | B60R 21/38 |
| | | | | 180/274 |
| 8,596,706 | B2 * | 12/2013 | McGuire | E05B 81/36 |
| | | | | 296/76 |
| 8,628,127 | B2 * | 1/2014 | Prasad | E05B 83/24 |
| | | | | 292/220 |
| 8,801,101 | B2 * | 8/2014 | Dagcioglu | B60N 2/3022 |
| | | | | 297/331 |
| 9,027,971 | B2 * | 5/2015 | Barczynski | E05B 83/24 |
| | | | | 292/100 |
| 9,120,461 | B2 | 9/2015 | Farooq et al. | |
| 9,145,716 | B2 * | 9/2015 | Jayasuriya | E05B 83/24 |
| 9,187,936 | B2 | 11/2015 | Kim et al. | |
| 9,222,288 | B2 * | 12/2015 | Townson | E05B 79/04 |
| 9,255,429 | B2 | 2/2016 | Kim et al. | |
| 9,366,066 | B2 * | 6/2016 | Hwang | E05D 11/00 |
| 9,382,731 | B2 * | 7/2016 | Kim | E05B 83/243 |
| 9,476,233 | B2 | 10/2016 | Uyanik et al. | |
| 9,512,650 | B2 | 12/2016 | Faruque et al. | |
| 9,637,082 | B2 * | 5/2017 | Ferri | B60R 21/38 |
| 9,644,404 | B2 * | 5/2017 | Strole | E05B 81/20 |
| 9,701,277 | B2 * | 7/2017 | McIntyre | B60R 21/38 |
| 9,863,170 | B2 | 1/2018 | Park et al. | |
| 9,963,103 | B2 * | 5/2018 | Nomura | B62D 25/105 |
| 10,035,490 | B2 * | 7/2018 | Kim | B60R 21/0136 |
| 10,118,587 | B2 * | 11/2018 | Czechtizky | E05D 3/06 |
| 10,272,003 | B2 * | 4/2019 | Zindler | B62D 33/037 |
| 10,309,130 | B2 * | 6/2019 | Schiffer | E05B 81/44 |
| 10,370,876 | B2 * | 8/2019 | Farrenkothen | E05B 83/00 |
| 10,584,521 | B2 * | 3/2020 | Nieto Avila | B62D 25/12 |
| 10,648,202 | B2 * | 5/2020 | Scholz | E05B 79/08 |
| 10,655,367 | B2 * | 5/2020 | Ferri | E05B 83/24 |
| 10,704,304 | B2 * | 7/2020 | Nelsen | E05B 83/24 |
| 10,717,407 | B2 * | 7/2020 | Szente | E05B 51/023 |
| 2010/0244484 | A1 * | 9/2010 | Nakaura | B60R 21/38 |
| | | | | 296/187.04 |
| 2012/0074715 | A1 * | 3/2012 | Kim | B60R 21/34 |
| | | | | 292/201 |
| 2013/0033069 | A1 * | 2/2013 | Hwang | B60R 21/38 |
| | | | | 296/187.04 |
| 2013/0087401 | A1 * | 4/2013 | Masih | E05B 17/0062 |
| | | | | 180/274 |
| 2015/0102607 | A1 * | 4/2015 | Kim | E05B 83/24 |
| | | | | 292/92 |
| 2015/0167369 | A1 * | 6/2015 | Hwang | B60R 21/38 |
| | | | | 16/233 |
| 2016/0177600 | A1 | 6/2016 | Kugler et al. | |
| 2016/0245003 | A1 | 8/2016 | McIntyre et al. | |
| 2016/0340941 | A1 | 11/2016 | Taurasi | |
| 2017/0036642 | A1 | 2/2017 | Nomura | |
| 2018/0030763 | A1 | 2/2018 | Distefano et al. | |
| 2018/0044954 | A1 * | 2/2018 | Hambusch | E05B 77/08 |
| 2018/0179788 | A1 * | 6/2018 | Oxley | E05B 81/13 |
| 2019/0218833 | A1 | 7/2019 | Nelsen et al. | |
| 2019/0232915 | A1 | 8/2019 | Szente et al. | |
| 2019/0338567 | A1 * | 11/2019 | Szente | E05B 77/08 |
| 2020/0232261 | A1 * | 7/2020 | Horn | E05B 17/0025 |
| 2020/0284068 | A1 * | 9/2020 | Cumbo | E05B 81/25 |
| 2020/0362598 | A1 * | 11/2020 | Taylor | E05B 81/20 |

FOREIGN PATENT DOCUMENTS

| | | | | |
|---|---|---|---|---|
| CN | 104125898 | A | 10/2014 | |
| CN | 104594739 | A | 5/2015 | |
| CN | 105228883 | A | 1/2016 | |
| CN | 105421909 | A | 3/2016 | |
| CN | 106246015 | A | 12/2016 | |
| CN | 107489322 | A | 12/2017 | |
| CN | 108482300 | A | 9/2018 | |
| DE | 10108880 | A1 | 9/2002 | |
| DE | 10204422 | A1 | 8/2003 | |
| DE | 10331081 | A1 | 2/2005 | |
| DE | 102004023729 | A1 | 12/2005 | |
| DE | 102005060750 | A1 | 6/2007 | |
| DE | 102006031617 | A1 * | 1/2008 | B60R 21/38 |
| DE | 102007012175 | A1 | 2/2008 | |
| DE | 102007021840 | A1 | 11/2008 | |
| DE | 10354163 | B4 | 8/2013 | |
| DE | 102013203801 | A1 | 4/2014 | |
| DE | 102007021840 | B4 | 8/2014 | |
| DE | 102013202207 | A1 | 8/2014 | |
| DE | 102013003956 | A1 | 9/2014 | |
| DE | 102004023729 | B4 | 10/2014 | |
| DE | 102013114414 | A1 | 3/2015 | |
| DE | 102013114106 | A1 | 4/2015 | |
| DE | 102014110146 | A1 | 6/2015 | |
| DE | 10343106 | B4 | 8/2015 | |
| DE | 102015100627 | A1 | 8/2015 | |
| DE | 102015115665 | A1 | 3/2017 | |
| EP | 1172507 | A2 | 1/2002 | |
| EP | 1528201 | B1 | 8/2006 | |
| EP | 1737709 | B1 | 11/2007 | |
| EP | 1541432 | B1 | 7/2008 | |
| EP | 2317038 | A2 | 5/2011 | |
| EP | 2341204 | A2 | 7/2011 | |
| EP | 2481645 | A1 | 8/2012 | |
| EP | 2615012 | A1 | 7/2013 | |
| EP | 2907731 | A1 | 8/2015 | |
| EP | 3036390 | A1 | 6/2016 | |
| EP | 3071768 | A1 | 6/2016 | |
| GB | 783576 | A | 9/1957 | |
| GB | 786493 | A | 11/1957 | |
| GB | 2480798 | A | 12/2011 | |
| JP | 2002019641 | A | 1/2002 | |
| JP | 2002206363 | A | 7/2002 | |
| JP | 4349157 | B2 | 10/2009 | |
| JP | 2012153208 | A | 8/2012 | |
| JP | 201323148 | A | 2/2013 | |
| KR | 20060053612 | A | 5/2006 | |
| KR | 20080038892 | A | 5/2008 | |
| KR | 20130018058 | A | 2/2013 | |
| KR | 20130049922 | A | 5/2013 | |
| KR | 1459937 | B1 | 11/2014 | |
| WO | 2008003402 | A1 | 1/2008 | |

(56) References Cited

FOREIGN PATENT DOCUMENTS

WO      2014186872 A1    11/2014
WO      2018057833 A1    3/2018

* cited by examiner

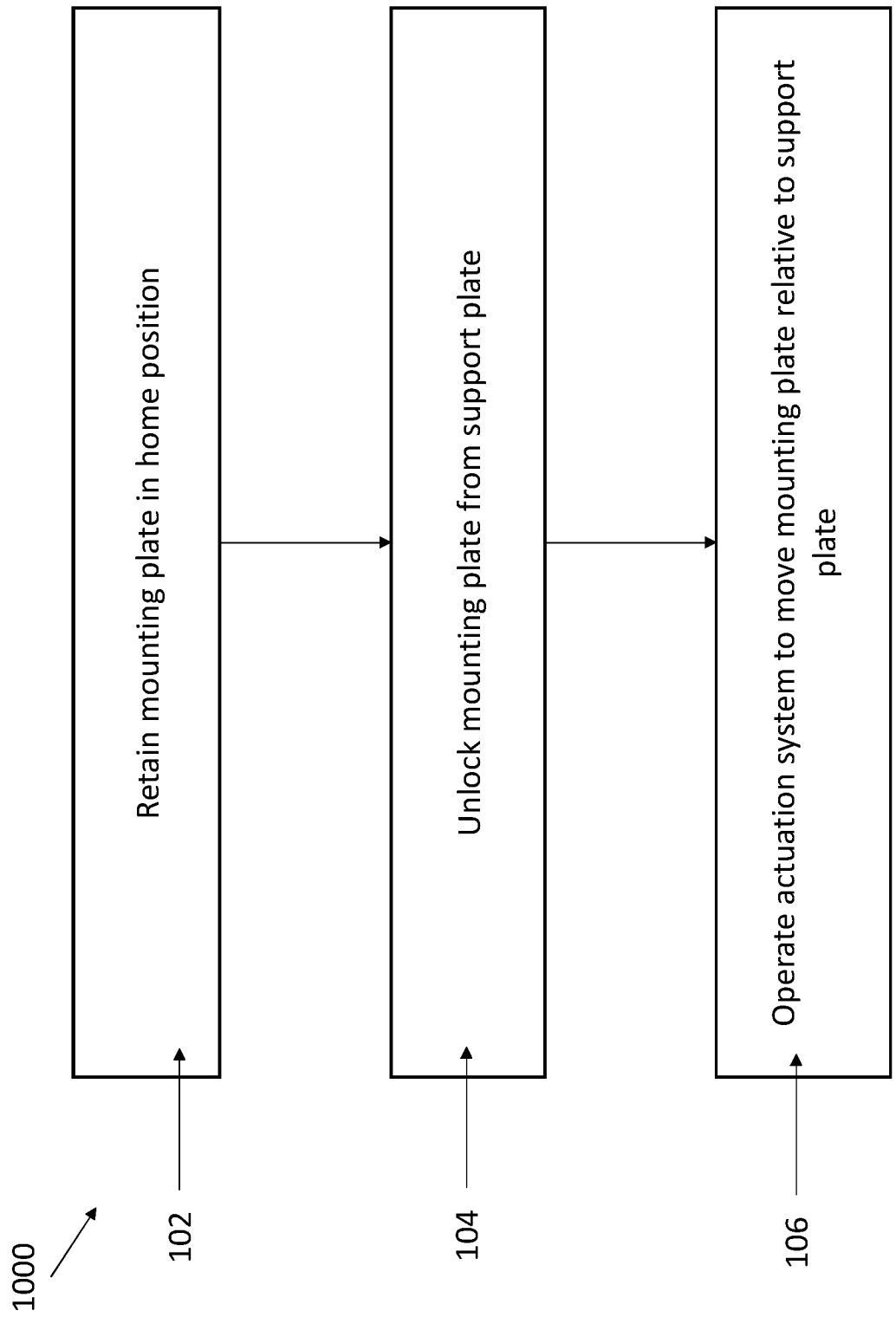

ACTUATED MECHANISM FOR ACTIVE PEDESTRIAN SAFETY LATCH

CROSS-REFERENCE TO RELATED APPLICATIONS

The application claims priority to U.S. Provisional Patent Application No. 62/623,126, filed on Jan. 29, 2018, and claims priority to U.S. Provisional Patent Application No. 62/667,172, filed on May 4, 2018; the entire contents of which are hereby incorporated by reference herein.

FIELD

The present invention relates to vehicle safety systems.

BACKGROUND

The automotive industry is attempting to better protect pedestrians from head on collisions with vehicles. When a car hits a pedestrian in a front end collision, the pedestrian can be thrown up and land on the front hood of the vehicle and/or the windshield. In an effort to ameliorate the harshness of the impact, and in particular to prevent the person's head from hitting the engine block or other hard point located directly underneath the front hood, it is desired to actively space the front hood from the engine block whenever a front end collision is detected. In particular, when a front end collision is detected by crash sensors, it is desired to move the front hood in a very short period of time (e.g., in milliseconds) from a first aerodynamic position where the front hood is normally located very close to the engine block to a second position where the front hood is actively moved few centimeters further away from the engine block. This activity could provide the pedestrian's head and/or torso with sufficient time and/or space to decelerate when the pedestrian impacts the front hood and thus prevent fatal injury. Amount of travel of travel of the front hood can be hampered by physical dimensions of latch components, such as a safety catch or hook. The hook can feasibly only be of a certain length, and as such can be a limiting factor for securely mounted latches in travel distances of the front hood while remaining coupled of the safety catch/hook during pop up travel.

Other problems in industry related to safety systems is actuation speed and/or actuation distance of safety devices (e.g. device response time) tempered with actuation power requirements. A further problem in industry is the need for reduced cost of safety systems, including module components to facilitate replacement a reduction in replacement costs.

SUMMARY

It is an object to the present invention to provide a component of a safety system to obviate or mitigate at least one of the above-mentioned problems.

A first aspect provided is a latch travel mechanism for a closure panel of a vehicle, the mechanism comprising: a mounting plate for mounting a latch, the latch for retaining the closure panel in a closed position with respect to a body of the vehicle; a support plate coupled to the mounting plate, the support plate for connecting to a body of the vehicle; one or more linkages connected to the support plate at one end and connected to the mounting plate at another end, the one or more linkages providing said coupled to the mounting plate; a locking member mounted on the support plate and configured for retaining the mounting plate in a home position when coupled to the mounting plate and for decoupling from the mounting plate when operated; an actuation system coupled to the one or more linkages for extending the one or more linkages once the locking member is decoupled from the mounting plate, in order to move the mounting plate relative to the support plate from the home position to an extended position; wherein the latch is also moved from the home position to the extended position when mounted on the mounting plate.

A second aspect provided is a method for operating a latch travel mechanism coupled to a closure panel of a vehicle, the method comprising the steps of: retaining a mounting plate in a home position by a locking member, the mounting plate having a latch mounted thereon for retaining the closure panel in a closed position with respect to a body of the vehicle, the mounting plate coupled to a support plate connected to the body of the vehicle; releasing the locking member in order to unlock the mounting plate from the support plate, the locking member retaining the mounting plate in the home position when coupled to the mounting plate and decoupling from the mounting plate when released; operating an actuation system in order to move the mounting plate relative to the support plate from the home position to an extended position; wherein the latch is also moved from the home position to the extended position as mounted on the mounting plate.

In accordance with another aspect, there is provided an active pedestrian system including a closure panel of a vehicle having a striker, and a latch travel mechanism for the closure panel. The latch travel mechanism includes a mounting plate for mounting a latch, the latch comprising a ratchet for slideably retaining the striker, the latch for retaining the closure panel in a closed position with respect to a body of the vehicle, a support plate coupled to the mounting plate, the support plate for connecting to a body of the vehicle, one or more linkages connected to the support plate at one end and connected to the mounting plate at another end, the one or more linkages providing said coupled to the mounting plate, and an actuation system coupled to the linkages for extending the linkages in order to move the mounting plate relative to the support plate from a home position to an extended position, wherein the latch is also moved from the home position to the extended position when mounted on the mounting plate, wherein the striker moves relative to the ratchet when the latch is moved.

BRIEF DESCRIPTION OF THE DRAWINGS

The foregoing and other aspects will be more readily appreciated having reference to the drawings, wherein:

FIG. 9 shows an example method of operation for the safety actuation system of FIG. 1A;

DESCRIPTION OF THE PREFERRED EMBODIMENTS

Figure 1A:
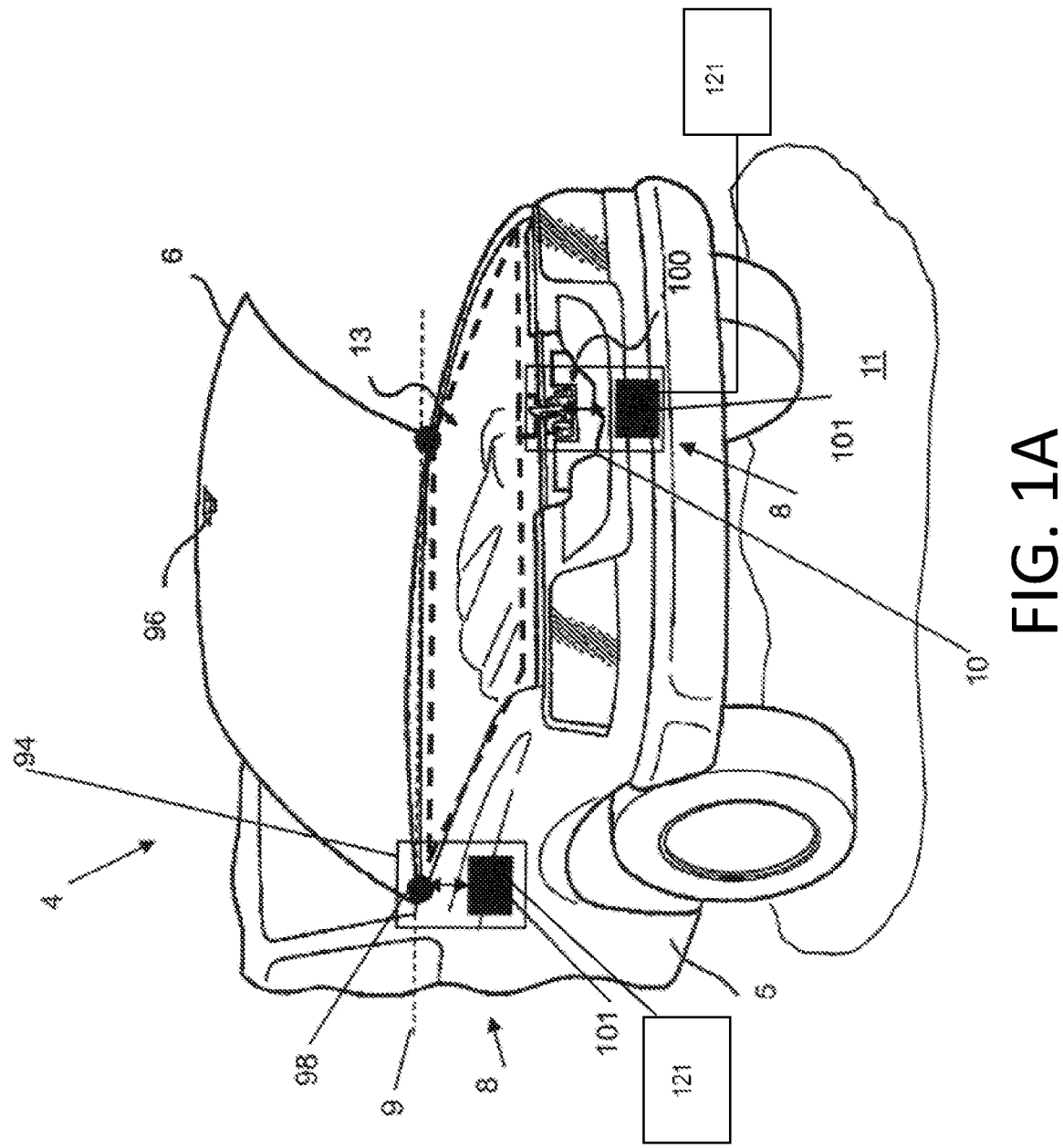
FIG. 1A is a perspective view of an example vehicle using a safety actuation system.

Referring to FIG. 1A, shown is a vehicle 4 with a vehicle body 5 having one or more closure panels 6. The closure panel 6 is connected to the vehicle body 5 via one or more panel operation components 8, for example such as but not limited to a hinge 98 and/or a latch 100 (e.g. for retaining the closure panel 6 in a closed position once closed or for retaining the closure panel 6 in an open position once opened). It is also recognized that the hinge 98 can be configured as a biased hinge that can be configured to bias the closure panel 6 towards the open position and/or towards the closed position. It is also recognized that the hinge 98 can be configured to pivot relative to the vehicle body 5. It is also recognized that the hinge 98 can be configured to pivot and move relative to the vehicle body 5, for example, hinge 98 may include a four bar linkage mechanism configured to allow the closure panel 6 to pivot and also move relative from the vehicle body 5, such as one of a forward movement or an aft movement. Further, the panel operation component 8 can be configured as a lift assist system including one or more struts, not shown, for example used in tail lift gate systems. The closure panel 6 can have a mating latch component 96 (e.g. striker) mounted thereon for coupling with a respective panel operation component 8 (e.g. latch) mounted on the vehicle body 5. Alternatively, the panel operation component 8 can be mounted on the closure panel 6 and the mating latch component 96 mounted on the body 5 (not shown). In further alternative, the panel operation component 8 can be used to operatively couple the closure panel 6 to the body 5, such as the case for the hinge 98. As further described below, it is envisioned that the mating latch component 96 would be retained by the latch 100 during force assisted travel (e.g. by an actuation system 101) of the closure panel 6 in an emergency situation.

The panel operation components 8 provide for movement of the closure panel 6 between a closed panel position (shown in dashed outline) and an open panel position (shown in solid outline), such that the operation component(s) 8 can be involved during the movement of the closure panel 6 between the open panel position and the closed panel position (e.g. for a hinge 98), can be involved in driving the movement of the closure panel 6 towards the open panel position (e.g. for an opening latch 100), or can be involved in driving the movement of the closure panel 6 towards the closed panel position (e.g. for a retaining latch 100). In the embodiment shown, the closure panel 6 pivots between the open panel position and the closed panel position about a pivot axis 9 (e.g. of the hinge 98), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 98 includes both pivot and translational components (not shown). As can be appreciated, the closure panel 6 can be embodied, for example, as a hood, passenger door or lift gate (otherwise referred to as a hatch) of the vehicle 4. Also provided is the actuation system 101 coupled to one or more of the panel operation components 8, such that the actuation system 101 is configured for actuating the operation or otherwise bypassing the operation of the one or more panel operation components 8, as further described below. In this manner, the actuation system 101 can be used to forcefully provide, during deployment, some form of force assisted open operation (e.g. full open, partial open, etc.) of the closure panel 6. The actuation system 101 can be deployed by any accelerated reaction time methods suitable, e.g. pyrotechnic, hydraulic, mechanical, and electrical, as desired.

For vehicles 4, the closure panel 6 can be referred to as a partition or door, typically hinged, but sometimes attached by other mechanisms such as tracks, in front of an opening 13 which is used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to the opening 13, or closed to secure or otherwise restrict access to the opening 13. It is also recognized that there can be one or more intermediate open positions (e.g. unlatched position) of the closure panel 6 between a fully open panel position (e.g. unlatched position) and fully closed panel position (e.g. latched position), as provided at least in part by the panel operation component(s) 8. For example, the panel operation component(s) 8 can be used to provide an opening force (or torque) and/or a closing force (or torque) for the closure panel 6.

Movement of the closure panel 6 (e.g. between the open and closed panel positions) can be electronically and/or manually operated, where power assisted closure panels 6 can be found on minivans, high-end cars, or sport utility vehicles (SUVs) and the like. As such, it is recognized that movement of the closure panel 6 can be manual or power assisted during operation of the closure panel 6 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6 can also include a secondary lock (e.g. closure panel 6 has a primary lock configuration at fully closed and a secondary lock configuration at partially open—for example for latches 100 associated with vehicle hoods).

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 5 of the vehicle 4. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 5 of the vehicle at the front, side or back of the door, as the application permits. It is recognized that the body 5 can be represented as a body panel of the vehicle 4, a frame of the vehicle 4, and/or a combination frame and body panel assembly, as desired.

Referring again to FIG. 1A, the closure panel 6 can be configured as a hood panel of the vehicle 4, such that each hinge 98 and respective actuation system 101 is configured as a hinge assembly 94, and the latch 100 and actuation system 101 is configured as a latch assembly 10. It is recognized that the actuation system 101 of the hinge assembly 84 can be optional, as desired.

Figure 2:
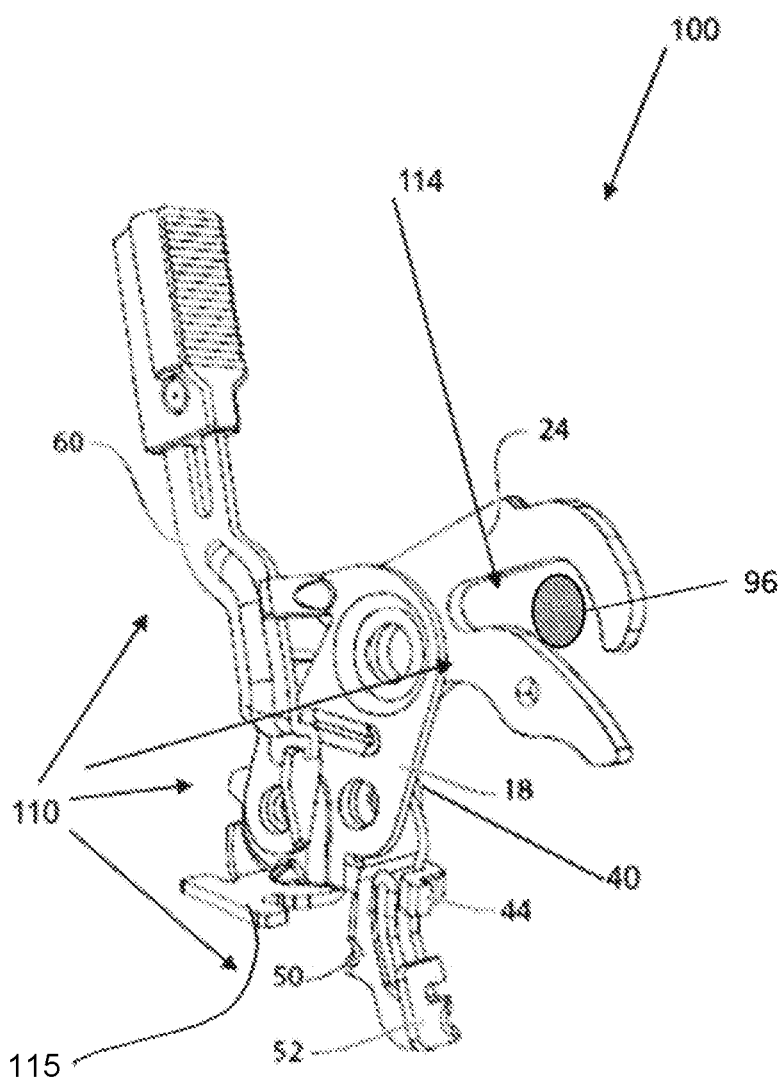
FIG. 2 is a front elevation view of the hood latch of FIG. 1 shown in isolation.

Referring to FIG. 2, one embodiment of the latch 100 includes a mounting plate 115 that can be contoured to facilitate attachment of the latch 100 to a frame (e.g. body 5) of the motor vehicle 4 (see FIG. 1A). The mounting plate 115 can be contoured to define a generally planar mounting surface and a plurality of apertures for attaching various components of the latch 100 thereto. Preferably, mounting plate 115 is a stamped metal component. A mating latch component 96 (e.g. striker) is secured to the closure panel 6 (e.g. hood 6) and extends outwardly therefrom. The mating latch component 96 can be a generally U-shaped bar that is engaged by the latch 100 to latch the closure panel 6 in the closed position. The latch 100 can be secured to the body 5 by mounting plate and positioned so that the mating latch component 96 will engage the latch 100 upon the closure panel 6 reaching the closed position. It is appreciated that, alternatively, the latch 100 may be secured to the closure panel 6 and the mating latch component 96 may be secured to the body 5 of the vehicle 4. Positioned on the mounting plate 115 can be a fish mouth or slot 114 for receiving the mating latch component 96 therein, in other words the slot 114 of the latch 100 is configured for receiving a keeper of the mating latch component 96. The slot 114 has an open top end and a closed bottom end. The latch 100 can also include a cover plate (not shown). The mounting plate 115 and cover plate can be interconnected by first and second rivets (not shown) that each have respective integral shafts extending beyond the cover plate. The mounting plate 115, cover plate and interconnecting rivets can provide a housing for the latch 100. Those skilled in the art will appreciate that a wide variety of alternative configurations may be deployed to provide the latch housing.

The latch 100 includes a number of latch elements 110 (e.g. a ratchet 24 and a pawl 40) that are configured to couple to the mating latch component 96 in order to retain the mating latch component 96 within the slot 114 when the closure panel 6 is in the closed position (e.g. locked). Alternatively, the latch elements 110, both of which are pivotally secured to the mounting plate 115. The ratchet 24 includes an arm and arm spaced apart to define the generally u-shaped slot 114 there between (e.g. a hook of arm and a lip of arm that extends laterally beyond the hook. The ratchet 24 can also include a primary shoulder stop and a pointed secondary shoulder stop. Note that in FIG. 2 the ratchet 24 is shown in a fully closed position (e.g. facilitating the retention of the mating latch component 96 in the slot 114) which may also be referred to as the primary closed position. An exemplary latch is shown in US2014/001528 entitled "Over Travel Hood Latch", the entire contents of which are incorporated herein by reference.

The ratchet 24 can be biased to an open position by a substantial torsion spring that is mounted pivotally on the rivet shaft and connected between the cover plate and the plate. The torsion spring is an example of a ratchet biasing member, which biases the ratchet 24 towards the open position. The ratchet 24 moves between a unlatched position for releasing the mating latch component 96 and a latched position, such that the mating latch component 96 is received in the slot 114 and cooperates with the receiving slot 114 of the mounting plate. The ratchet 24 is biased to the unlatched position via a biasing member. The pawl 40 has can have a shoulder (or detent) that interacts or otherwise engages with primary and secondary shoulder stops of the ratchet 24, in order to releasably retain the ratchet 24 in the latched position. The pawl 40 can also feature a primary release tab 44 and/or a secondary release tab.

The pawl 40 is biased to a locking position (e.g. latched position) where the ratchet 24 is shown in a primary closed position by a torsion spring. The torsion spring 48 is an example of a pawl biasing member. Accordingly, the pawl 40 can be biased to disengage with the ratchet 24 via the pawl biasing member.

A release lever 50 can also pivotally mounted between the frame plate 12 and the cover plate 18. The primary release lever 50 can include a tab 52 for connection to a release cable (not shown) that is connected to a release handle (not shown) located in the vehicle 4 compartment for initiating by a driver for opening of the latch 100. The end result of operation of the release lever 50 is that the pawl 40 is disengaged with the ratchet 24, under action of the pawl biasing member, thus allowing the ratchet biasing member to assist in pivoting the ratchet 24 from the closed (or latched position to the open or unlatched position (not shown). The primary release lever 50 can interact with the pawl 40 via its primary release tab 44 and can thus also be biased by pawl biasing member into the non-engaged position. The latch components 110 can also include a safety catch of latch hook 97, which can be pivotally mounted to the mounting plate 115 or latch housing 93, as desired. It is recognized that the latch hook 97 has a hook portion 97a that can catch or otherwise retain the mating latch component 96, when released from the ratchet 24, in a secondary latched position. In order to finally release the mating latch component 96 from the latch 100, the hook portion 97a of the latch hook 97 would be pivoted (e.g. manually) out of the way of the mating latch component 96. As further described below, the latch 100 (as mounted on the mounting plate 115), can be moved from a home position (see FIG. 3) to an extended position (see FIG. 7). In the operational examples given, when moving to the extended position, the mating latch component 96 can be retained in the slot 114 by the ratchet 24. Alternatively, when moving to the extended position, the mating latch component 96 can be released from the slot 114 by the ratchet 24 but further retained by the hook portion 97*a* of the latch hook 97.

As noted above, the latch 100 can be coupled to actuation mechanism 101, shown in FIG. 1*a* and FIGS. 3-7. The actuation mechanism 101 can include the support plate 117 that can connect to the mounting plate 115 of the latch 100 and thereby can form part of the latch housing 93, as desired. The mounting plate 115, the support plate 117, linkages 118, and the actuation mechanism 101 can be collectively referred to as a latch travel mechanism 99 or with inclusion of the latch 100 as a latch travel assembly 99, as desired.

Figure 5A:
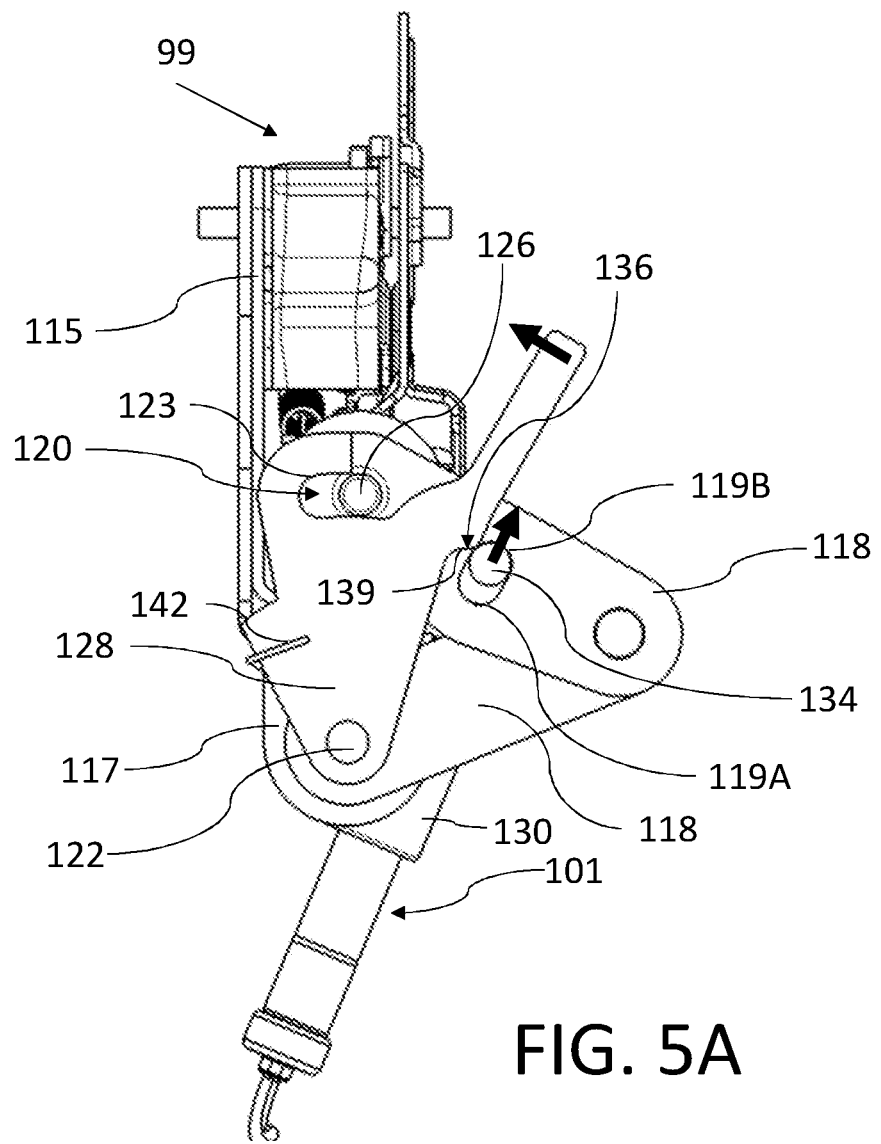
FIGS. 5A and 5B shows a side and front view of the latch of FIG. 1 as released while yet in the home position.
Figure 5B:
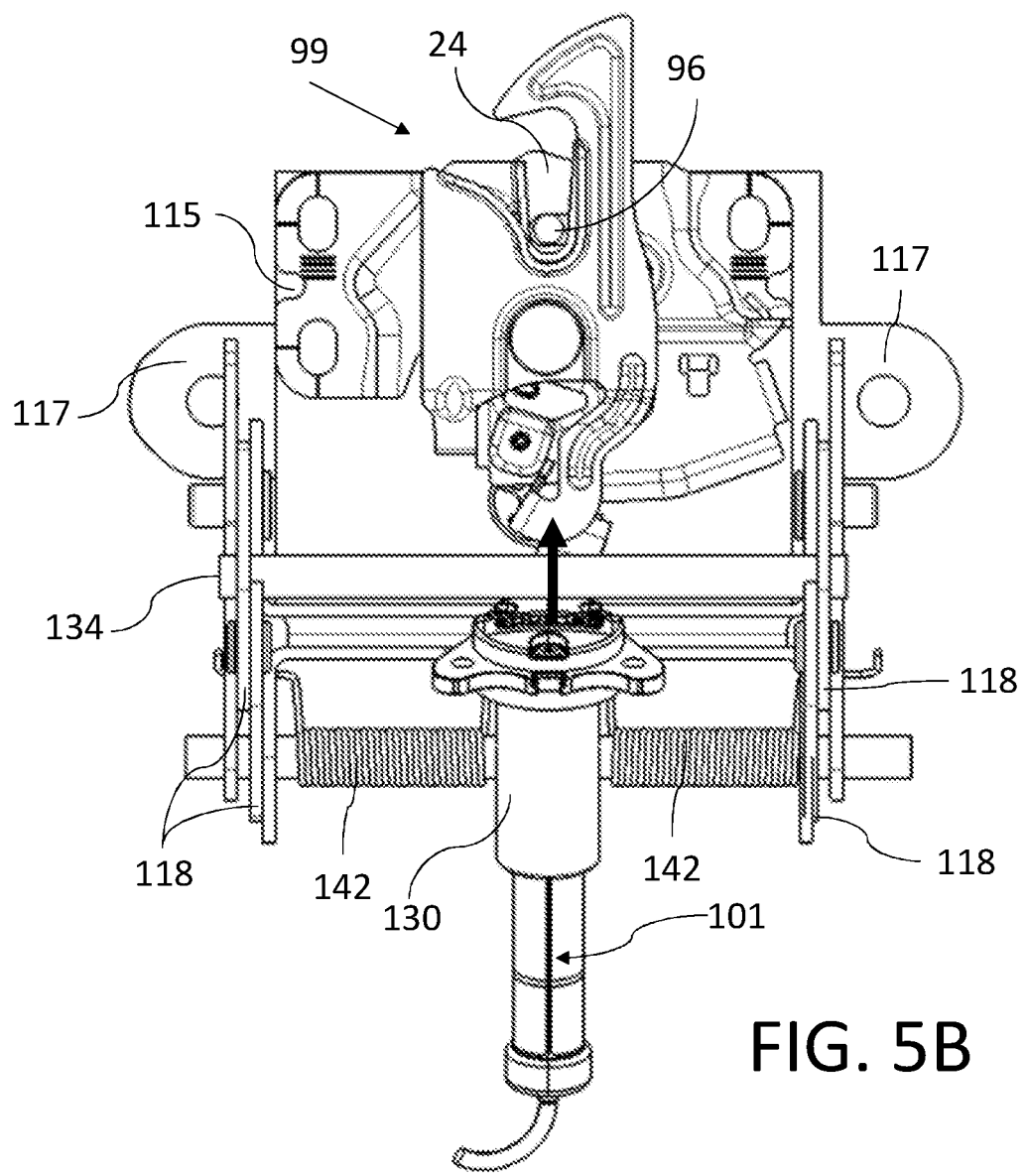
Figure 5C:
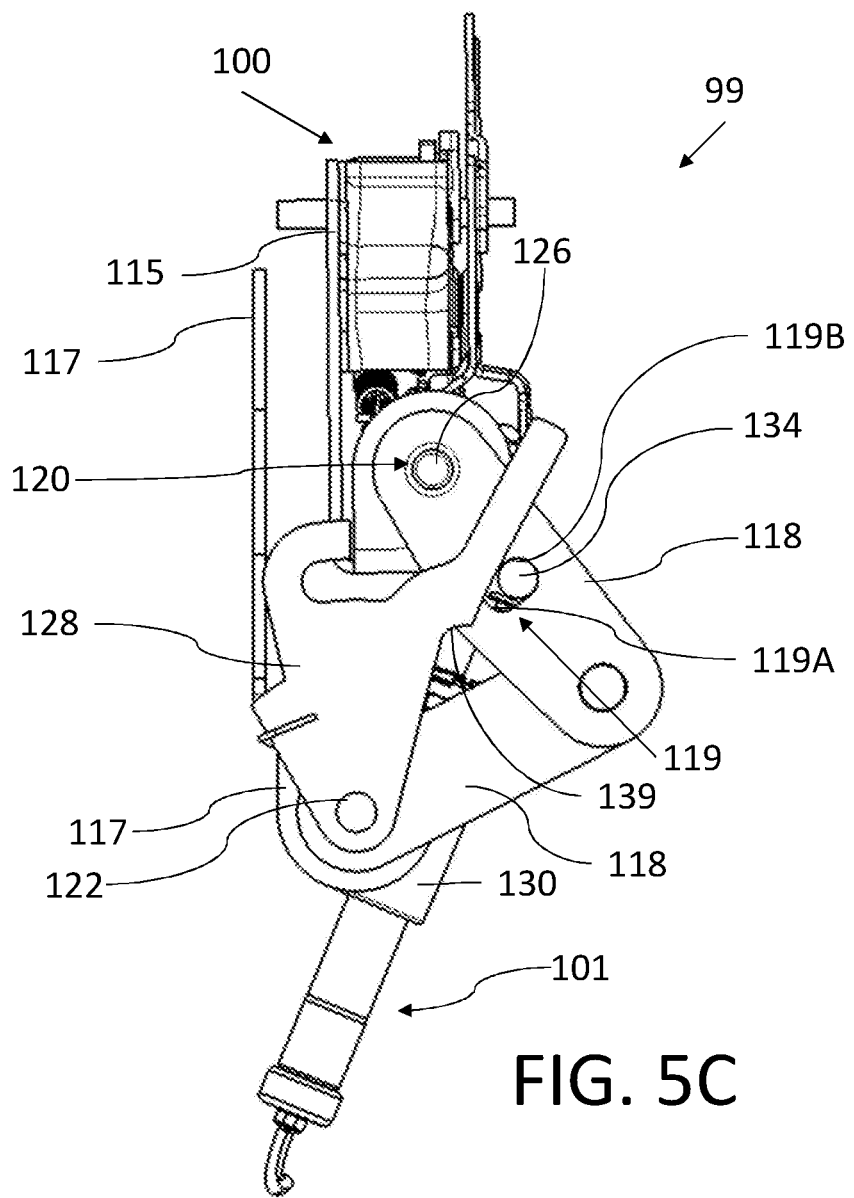
FIGS. 5C and 5D shows a side and front view of the latch of FIG. 1 as released and in a partially extended position.
Figure 5D:
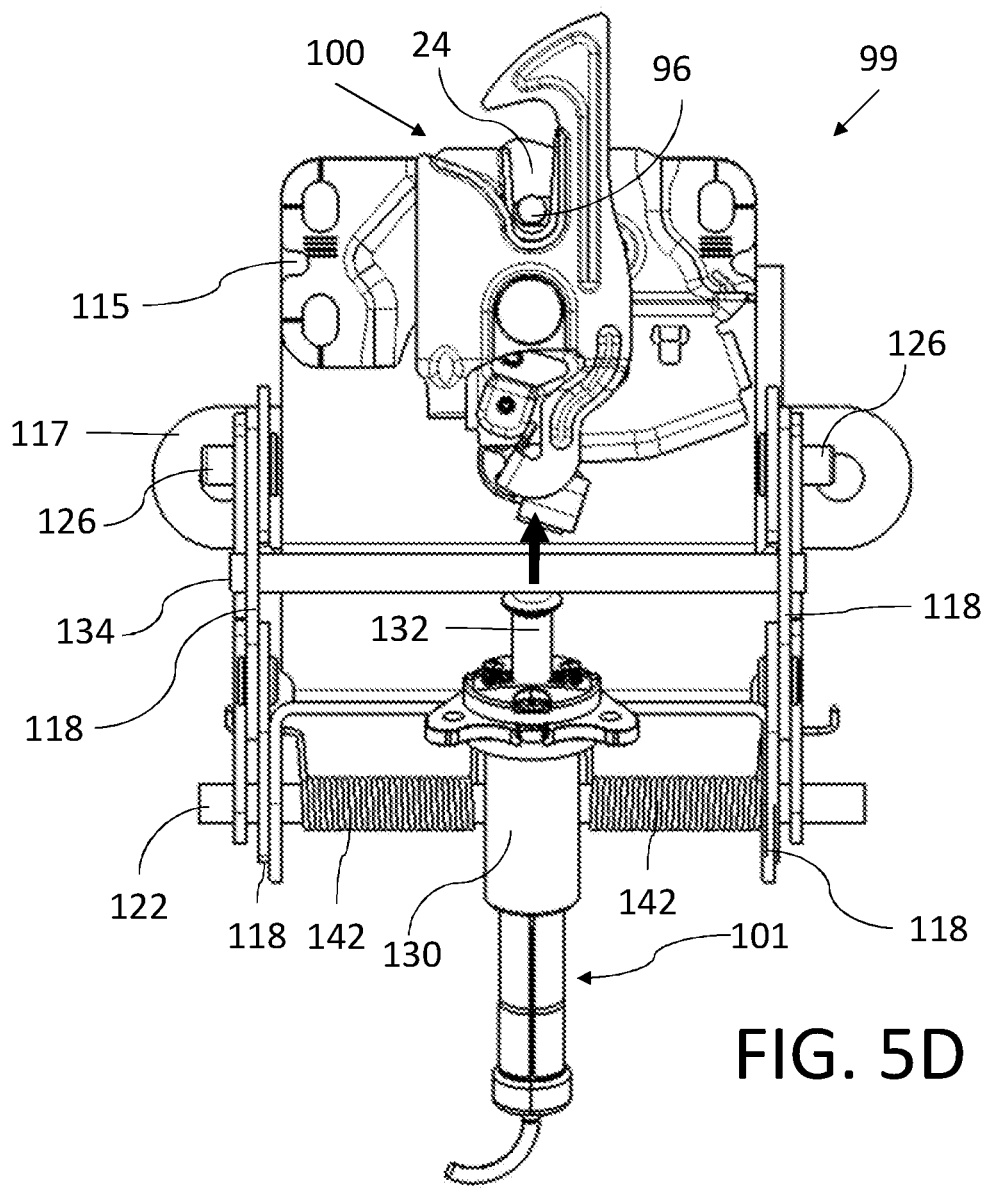
Figure 6A:
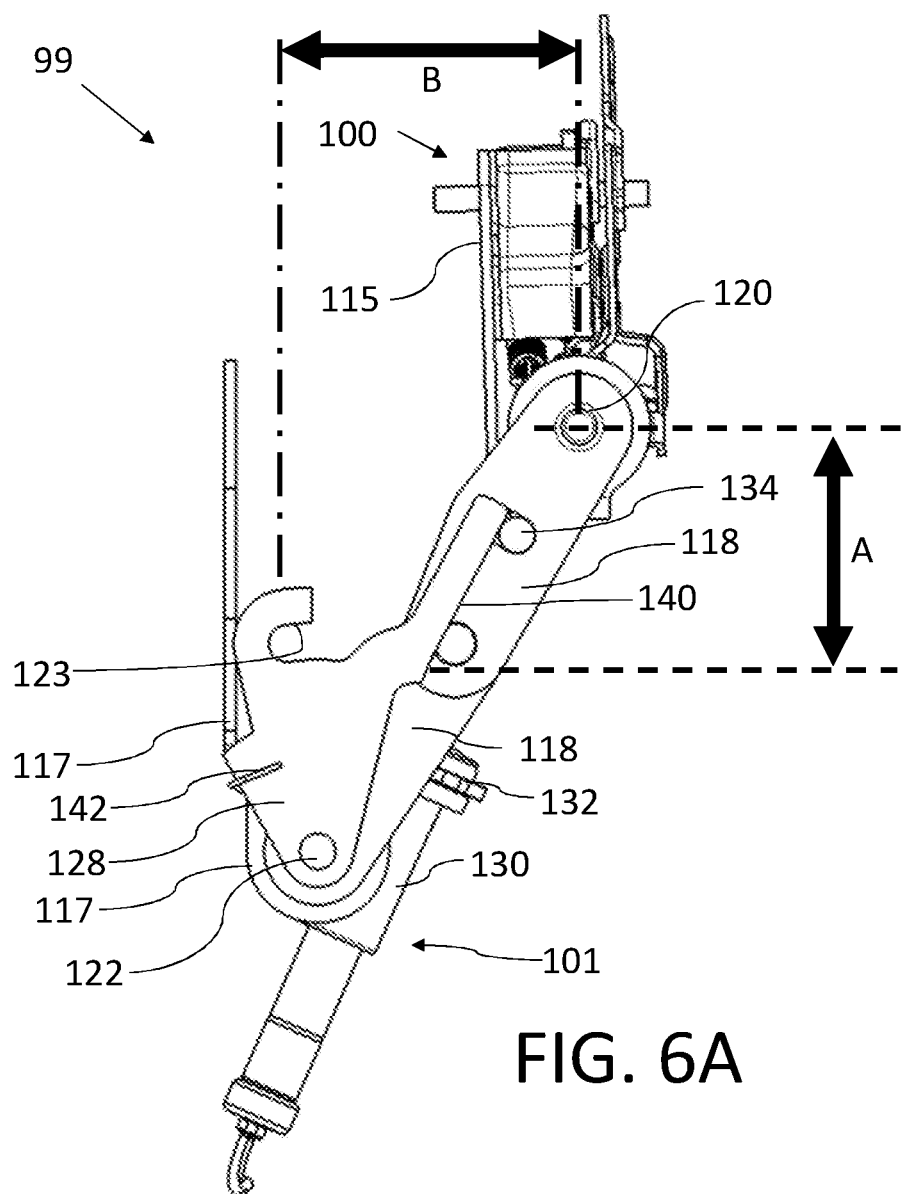
FIGS. 6A and 6B shows a side and front view of the latch of FIG. 1 as released and in an extended position.
Figure 6B:
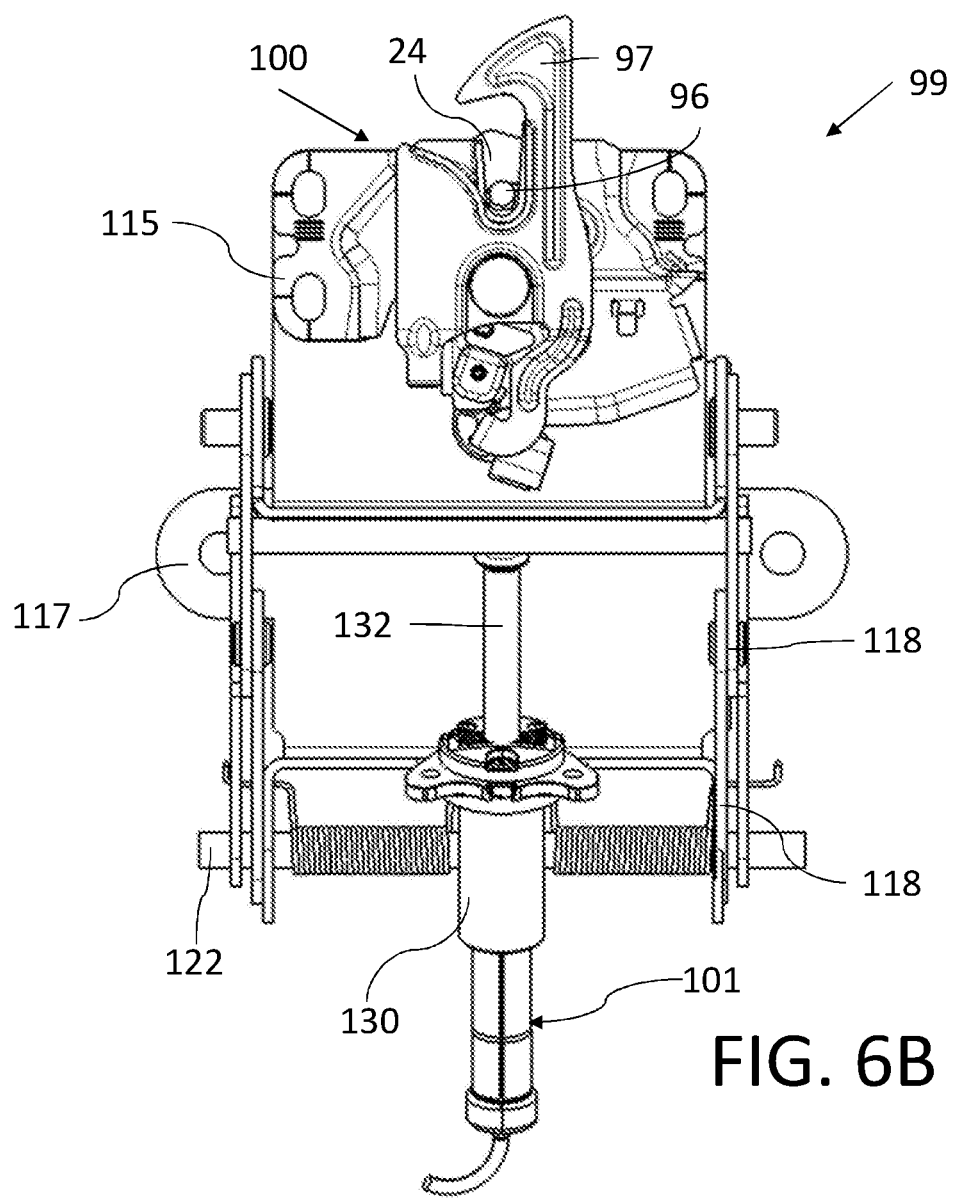
Figure 7:
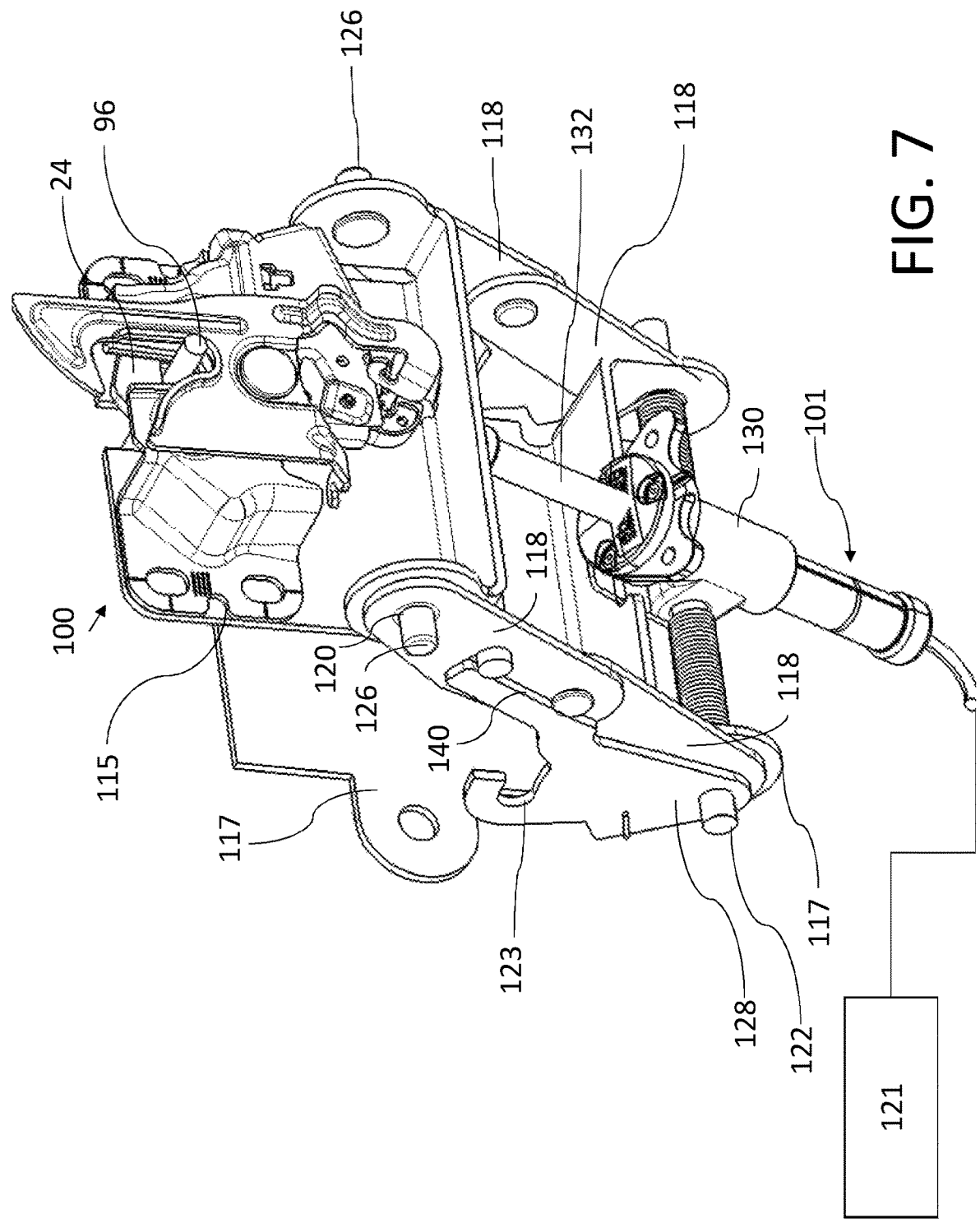
FIG. 7 shows perspective front view of the latch of FIG. 1 as released and in the extended position.

It is recognized that in the embodiments of the latch 100 shown in FIGS. 3-7, the mounting plate 115 is connected to the support plate 117 via the linkages 118, such that the linkages 118 can be connected by a hinge or pivot 120 at one end 6*a* to the mounting plate 115 and at the other end 6*b* via a hinge or pivot 122 to the support plate 117. The support plate 117 can be connected to the body 5 (see FIG. 1A) via mounting holes 124. Pivot 120 can have a pin 126 (see FIG. 7) for coupling with a locking member (e.g. locking hook) 128 when the latch 100 is in a home (or non-extended) position (see FIG. 3), such that when the pin 126 is retained by the locking member 128 (e.g. in notch as shown by example) the latch 100 is inhibited from extending (as shown in FIGS. 6A, 6B and 7 in the extended position). The locking member 128 can be configured to pivot about a pivot point (e.g. pivot 122), such that the locking member 128 is biased about the pivot point 122 by a biasing member (e.g. spring—not shown) into contact with the pin 126 for retaining the latch 100 in the home or non-extended position (e.g. receiving of the pin 126 in notch 123 of the locking member 128). It is recognized that operations other than pivoting (e.g. linear extension and retraction—not shown) of the locking member 128 with respect to the pin 126 can be envisioned as desired. Two locking members 128 are illustratively shown oppositely mounted but, one locking member 128 may be provided as a non-limiting example.

Referring again to FIG. 3, the actuation mechanism 101 can be mounted on the body 5 or on the support plate 117 itself, such that operation of the actuation mechanism 101 can be used to decouple the pin 126 from the locking member 128, thus facilitating movement of the latch 100 from the home position (see FIG. 3) to the extended position (see FIGS. 6A, 6B and 7). It is noted that pin 126 is not shown in FIG. 3 for visual clarity purposes only. The actuator mechanism 101 can have a housing 130 with actuation means (e.g. [pyrotechnic) for extending and retracting a piston 132 (see FIGS. 6A, 6B and 7) for facilitating movement of the latch 100 (as well as mounting plate 115) between the home and extended positions.

Figure 3:
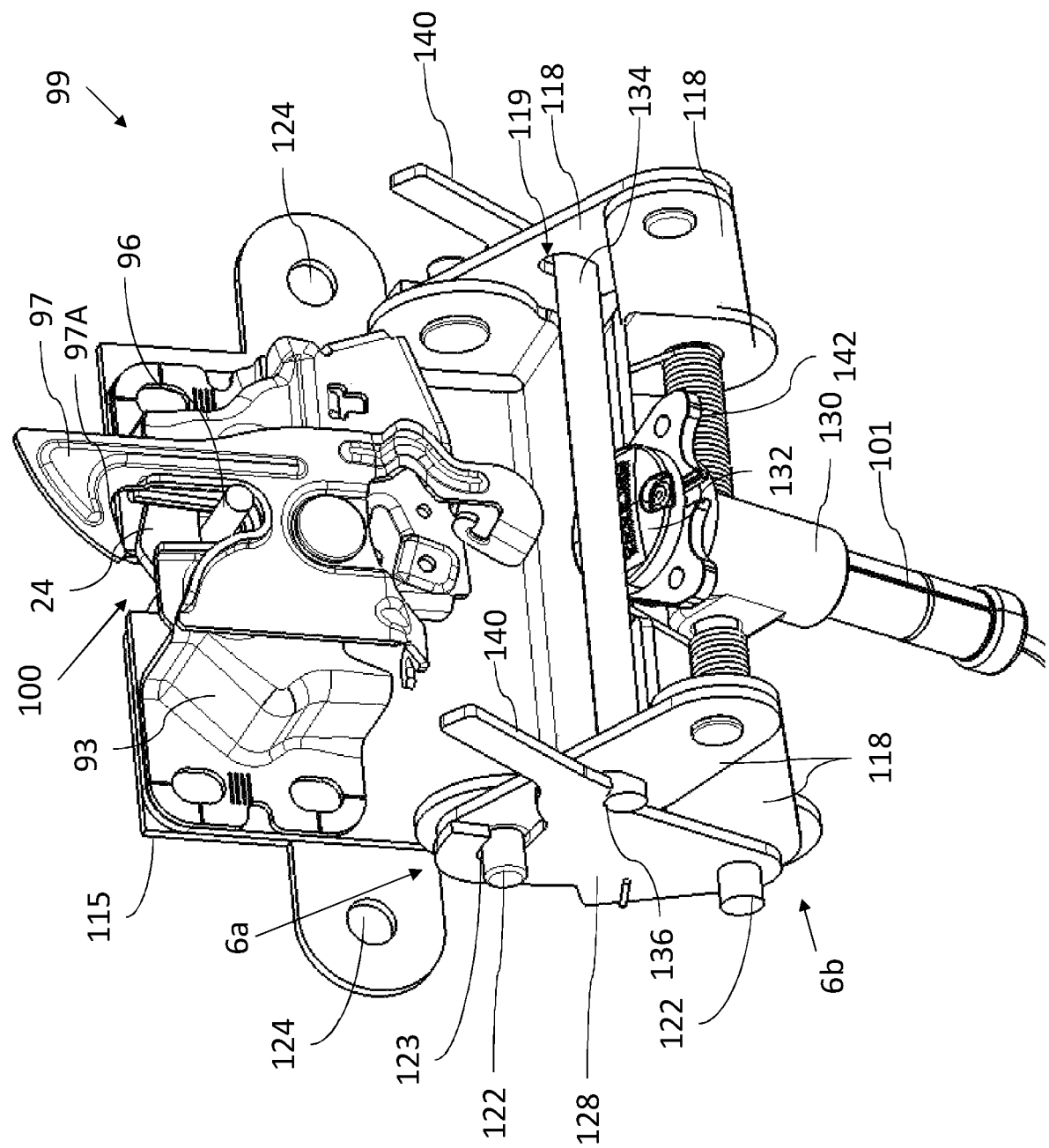
FIG. 3 is a front perspective view of the hood latch of FIG. 1 shown in a primary home position.
Figure 3A:
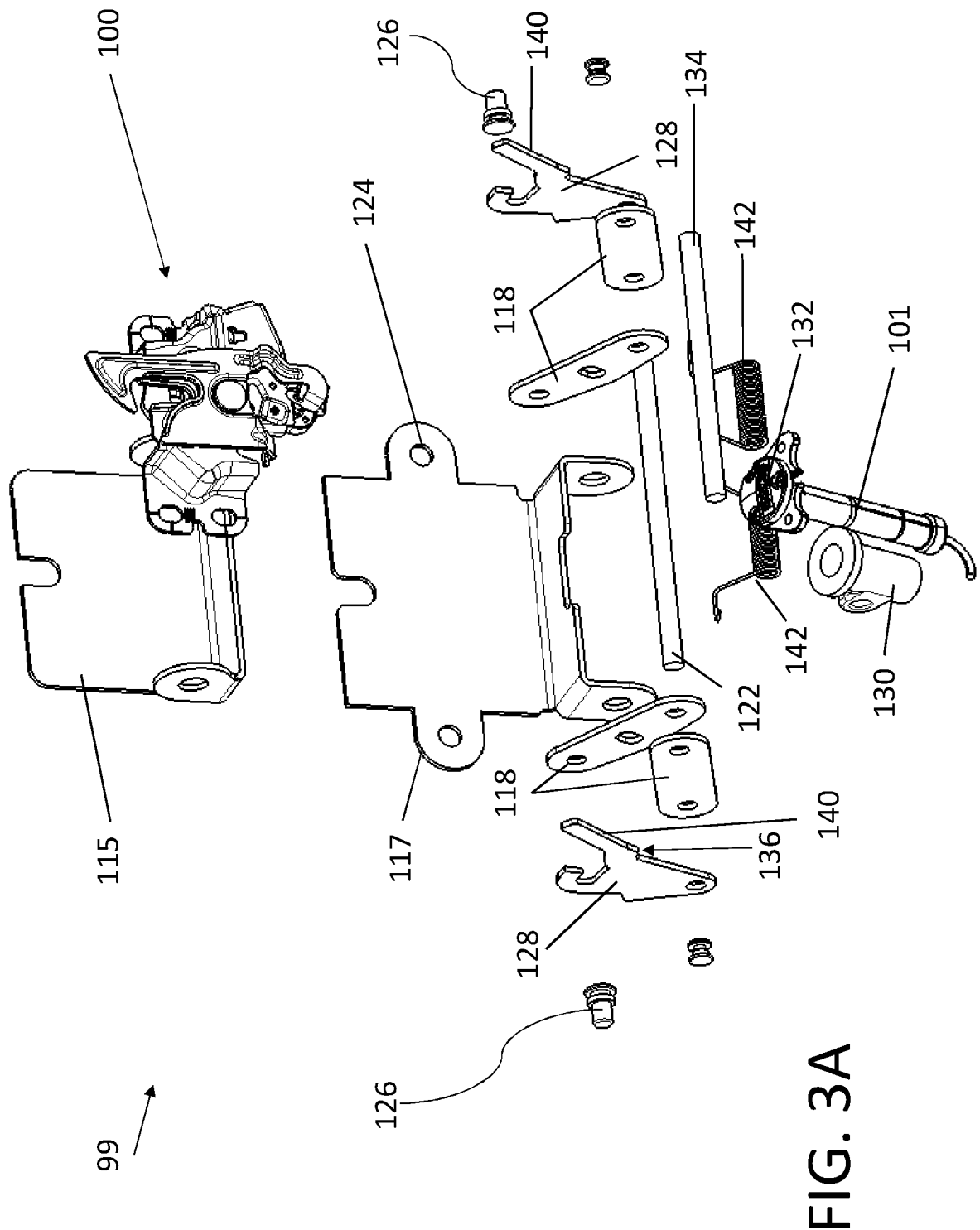
FIG. 3A is an exploded view of the hood latch of FIG. 3.

One example of the interaction of the piston 132 with the latch 100 is shown in FIG. 3, such that an actuator link 134 is connected to the linkages 118, such that a force of the piston 132 on the actuator link 134 causes the linkages 118 to extend and thus move the latch 100 from the home position to the extended position. A pretravel slot 119 is provided on each of the linkages 118 which allow the actuator link 134 to move between a first slot end 119-A to a second slot end 119-B without influencing motion on the linkage 118. When the actuator link 134 reaches the second slot end 119-B (from an initial resting or home position at the first slot end 119-A) the actuator link 134 will enter into abutting contact therewith to be able to therefore urge the linkage 118 into an upward motion as guided by the motion of the piston 134 during an additional travel of the actuator link 134. During its transition between the first slot end 119-A and the second slot end 119-B, the actuator link 134 will impart the movement of the locking member 128 out of coupling with the pin 126, (and without imparting motion of the linkage 118 until the locking member 128 has been disengaged with the pin 126), through the engagement of the actuator link 134 with a cam surface 139 of the notch 136. However, it is recognized that the actuator link 134 can be positioned on the latch 100, itself and/or the mounting plate 115 (for example) in order to provide for extension of the latch 100 when acted upon by the piston 132 (as driven by the actuator mechanism 101).

Referring again to FIG. 3 as one embodiment of coupling of the actuator link 134 to the latch 100/mounting plate 115, in this case via the linkages 118 themselves, the actuator link 134 can be received in a notch 136 in the locking member 128 when the locking member 128 is engaged with the pin 126 (when the latch 100 is in and retained in the home position). The locking member 128 can also have a travel surface 140 extending from the notch 136 in order to guide travel of the actuator link 134 as the latch 100 translates from the home to the extended position.

Figure 4A:
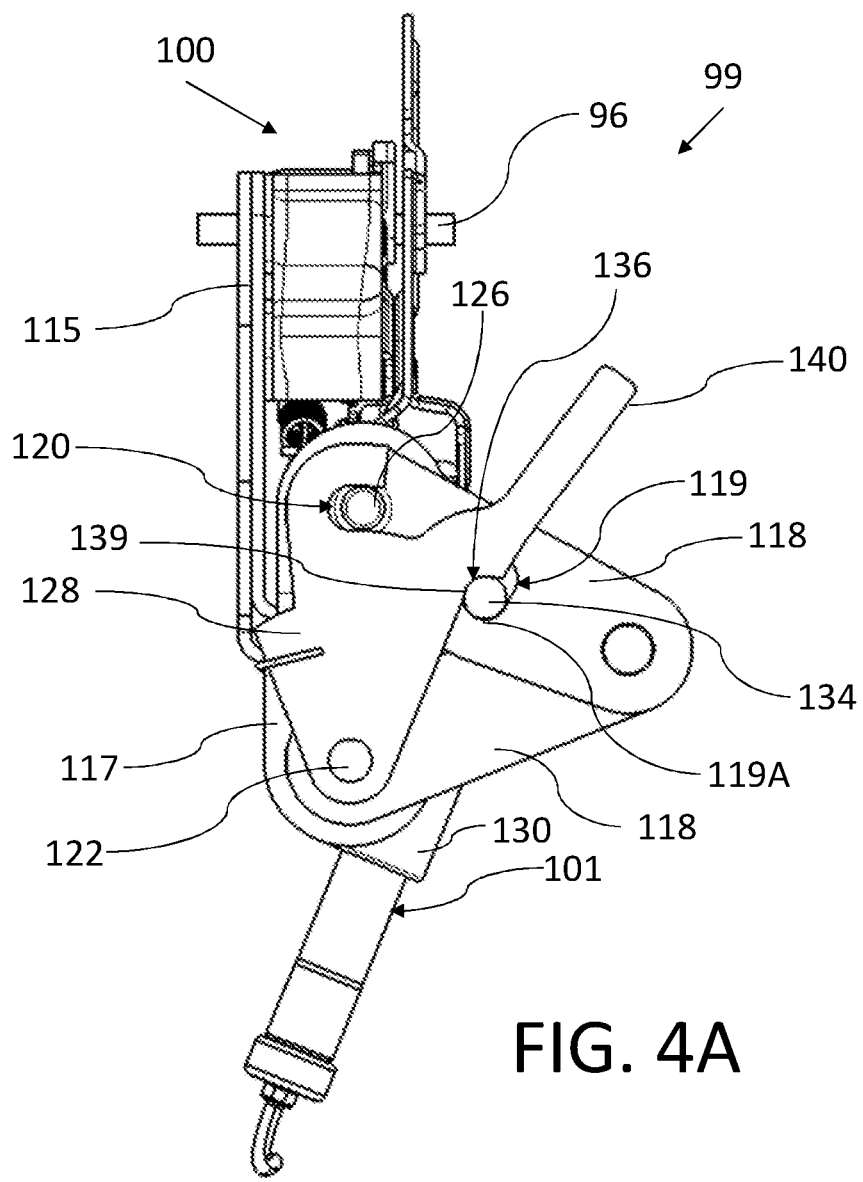
FIGS. 4A and 4B shows a side and front view of the latch of FIG. 1 as retained in the home position.
Figure 4B:
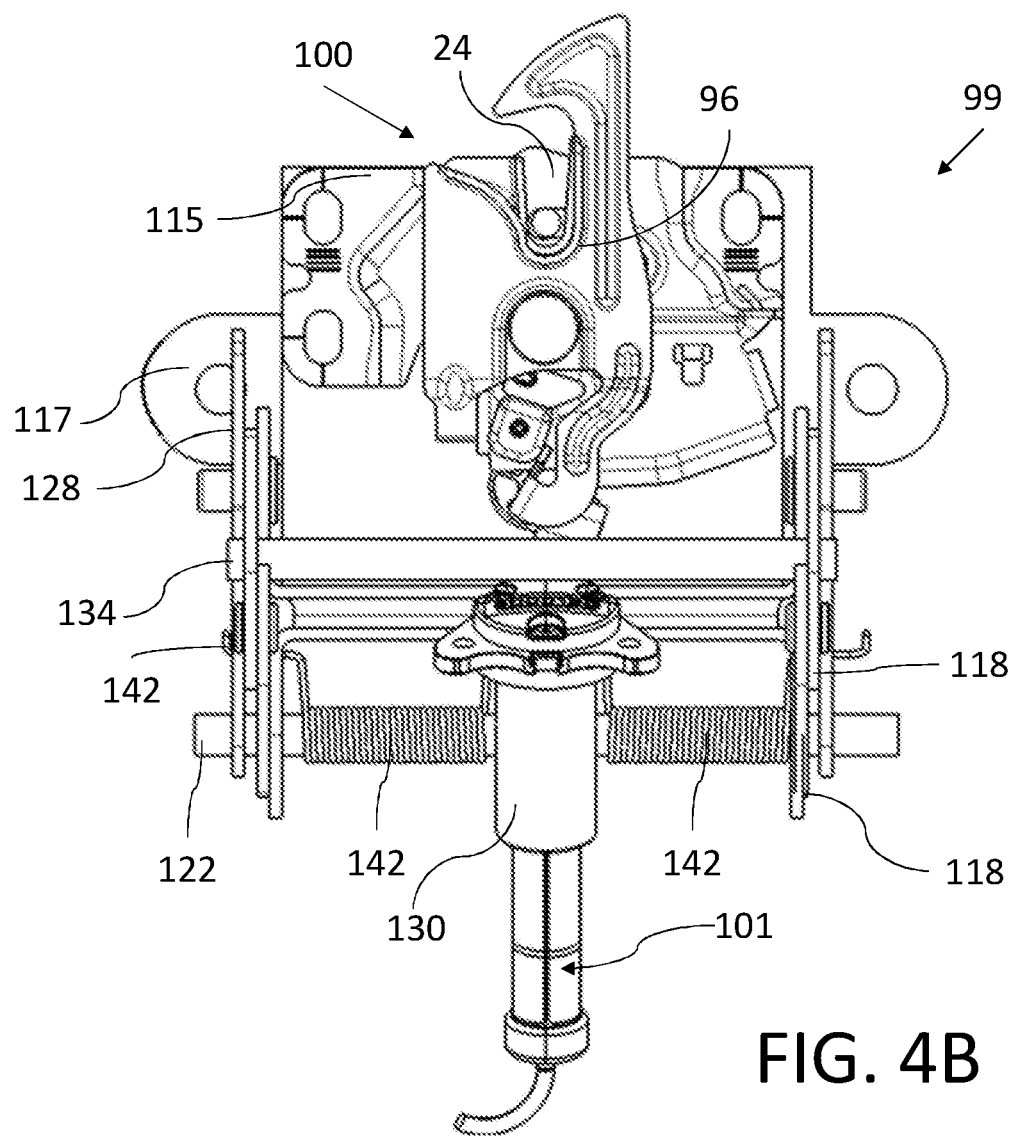

In operation, as shown in FIGS. 4A, to 6B, the latch 10 is first (in FIG. 1) held in the home positon by retention of locking member 128 with pin 126. In this state, the linkages 118 are also retracted as pivots 120, 122 are adjacent to one another as the mounting plate 115 is seated adjacent to the support plate 117. Next, as shown in FIGS. 5A and 5B, the locking member 128 is decoupled from the pin 126. This decoupling (e.g. the pin 126 is removed from the notch 123 is shown by example only, as a result of initial movement (i.e. deployment) of the piston 132 by the actuation system 101, as the locking member 128 is rotated about pivot 122 against its bias towards the pin 126. FIGS. 5C and 5D show the latch 100 (and mounting plate 115) in a partially extended position. FIGS. 6A and 6B shows the latch 100 (and mounting plate 115) in the extended position as indicated by the travel distance A vertically from the home position as well as travel distance B horizontally from the home position. For example, the travel distances A,B facilitate the extended movement of the latch 100 about the pivot position of the hood 6 via hinge 98 (see FIG. 1A). It is recognized that the latch 100 can be closed (i.e. latched such that the striker 96 is retained in by the ratchet 24—see FIG. 2) when the latch 100 is in the home (see FIGS. 3,4A, and 4B) and/or extended (see FIGS. 6A, 6B, 7) positions.

As such, referring to FIGS. 6A, 6B, 7, the latch 100 as shown has an active pop-up height (e.g. travel distance A), e.g. min 60 mm pop-up height during active firing of the actuator system 101. After latch 100 firing (e.g. deployment of the pyrotechnic actuator) the deactivation (return to secondary position) can be done by pulling an inside release handle. For example, there can be no pressure in the actuator piston 132 after active firing of the chemical actuator. The latch hook 97 (e.g. secondary catch) can be attached to the latch 100 or to the striker 96, as desired. The latch 100 of FIG. 3 can be a modular latch assembly.

Referring again to FIGS. 3 and 4A and 4B, biasing member 142, e.g. torsion spring, can be used to bias the locking member 128 towards engagement with the pin 126. As shown, the linkages 118 have a pair of links on either side of the support plate 117, however it is envisioned that other configurations of linkages 118 can be used as desired, in order to translate/rotate the latch 100 from the home to the extended position.

Figure 8A:
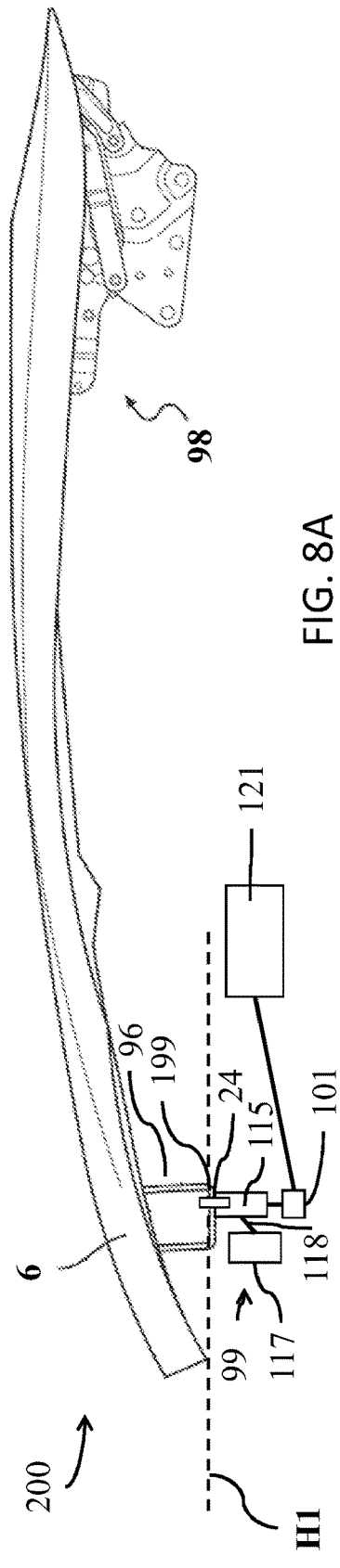
FIGS. 8A to 8C are sequential views of a mating latch component being moved by the latch of FIG. 4 from an initial position to an active pop-up position.
Figure 8B:
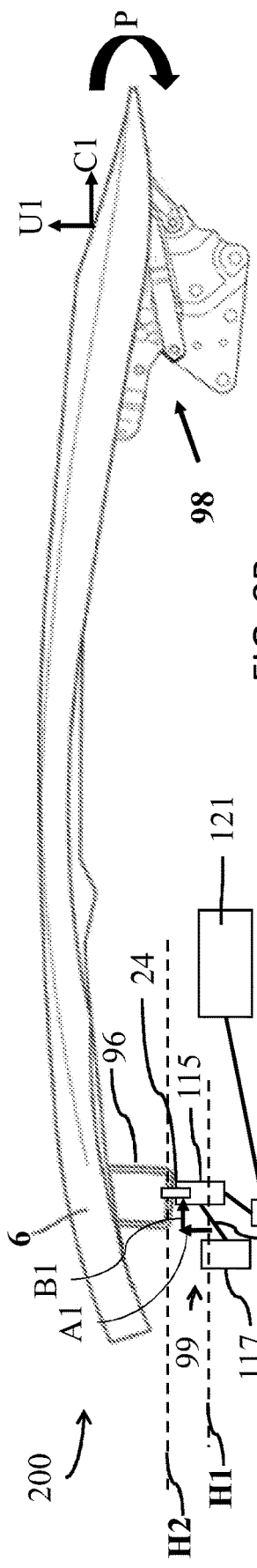
Figure 8C:
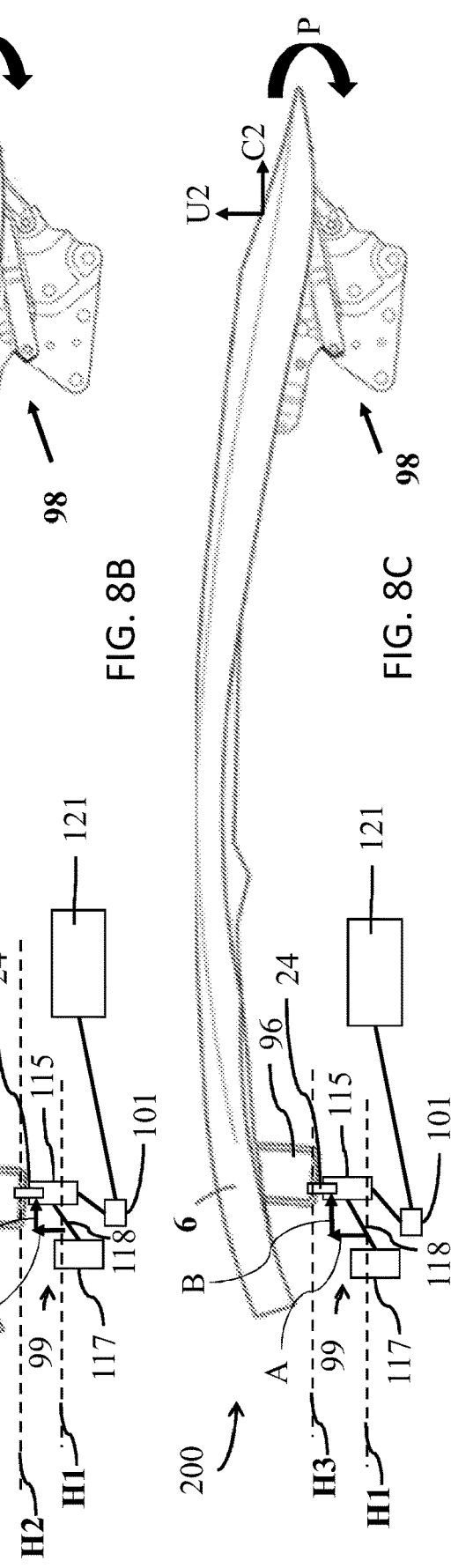

Now referring to FIGS. 8A to 8C, there is illustrated an active hood system 200 including latch 100, closure panel 6, and hinges 98. In operation, FIG. 8A shows the mating latch component 96 at an initial height H1 and engaged with the ratchet 24, the ratchet 24 being held by the pawl 40 in the primary latched position. Locking member 128 is coupled with the pin 126, and in this state, the linkages 118 are retracted as pivots 120, 122 are adjacent to one another as the mounting plate 115 is seated adjacent to the support plate 117 as illustrated in FIGS. 4A and 4B and as described hereinabove. Upon detection of an active pedestrian event (e.g. an imminent collision or detected collision of the vehicle 4 with a pedestrian using sensors), the active pedestrian control system 121, or the vehicle Body Control Module, being in electrical communication with actuation mechanism 101, commands actuation mechanism 101 to fire to deploy the piston 132.

As shown in FIG. 8B, the ratchet 24 remains engaged by the pawl 40, locking member 128 is decoupled with the pin 126, and mounting plate 115 and support plate 117 have moved apart from one another, and for example the mounting plate 115 has moved upwardly, for example a distance A1 and aftwardly for example a distance B1 corresponding to the partially deployed state of latch travel assembly 99 illustrated in FIGS. 5C and 5D, to urge the mating latch component 96 to be moved away from its initial position H1 to a height H2 and cause closure panel 6 to also move upwardly and aftwardly, for example as a result of pivoting at hinge 98, or for example as a result of an active deployment of hinge 98, as shown configured having a four bar linkage mechanism.

At the end of travel of the movement of piston 132 as shown in FIG. 8C, the linkages 118 are fully extended and mounting plate 115 and support plate 117 are distanced from one another as represented by vertical distance A and horizontal displacement B such that the mating latch component 96 to be moved away from its initial position H1 to a height H3 greater than H2. The closure panel 6 is now shown in its active pedestrian deployed position and the latch travel assembly 99 is in a state illustrated in FIGS. 6A and 6B. During the operation of the active hood system 200, hinge 98 may also be configured to be deployed by the movement of the closure panel 6 resulting from the activation of latch 100 and adopt at least one of a vertical movement U1, U2 and a horizontal aftwards movement C1, C2, and for example as shown in FIGS. 8A to 8C. Hinge 98 may be configured having a four bar linkage assembly and also include an actuation mechanism, similar to actuation mechanism 101 also responsive to a signal from controller 121, to allow closure panel 6 to move at least one of upwardly U, aftwardly A, as well as pivotally P, in tandem to the mounting plate 115 acting on the mating latch component 96. In another embodiment or in combination, mating latch component 96 may be configured to slide relative to ratchet 24 within slot 114 such that the movement of mounting plate 115 is unhindered by the mating latch component 96, for example as would be caused by the type of hinge 98, such as hinge 98 providing a pivoting connection between the closure panel 6 and the vehicle body 5. Latch component 96 embodied as a striker formed from a bent rod may include a horizontally extending portion 199 which may be adapted to be extended in length to accommodate such a horizontal portion within the slot 114 such that vertically extending portions 197 do not contact with ratchet 24 to hinder the aftwards movement of mounting plate 115.

Referring to FIG. 9, shown is an example operation 1000 of the latch travel mechanism 99 coupled to the closure panel 6 of the vehicle 4. The method 1000 comprising the example steps of: retaining 102 the mounting plate 115 in the home position by the locking member 128, the mounting plate 115 having the latch 100 mounted thereon for retaining the closure panel 6 in the closed position with respect to the body 5 of the vehicle 4, the mounting plate 115 coupled to the support plate 117 connected to the body 5 of the vehicle 4; releasing 104 the locking member 128 in order to unlock the mounting plate 115 from the support plate 117, the locking member 128 retaining the mounting plate 115 in the home position when coupled to the mounting plate 115 and decoupling from the mounting plate 115 when released; operating 106 the actuation system 101 in order to move the mounting plate 115 relative to the support plate 117 from the home position to the extended position; wherein the latch 100 is also moved from the home position to the extended position as mounted on the mounting plate 115.

Reference is made to the above figures, which show the different versions of the actuation system 101. The device of the actuation system can include a fluid-actuated cylinder, a control valve and a source of pressurized fluid. The cylinder can includes a cylinder housing and a piston that is movable in the cylinder housing between an unactuated position and an actuated position. A piston biasing member (not shown) can be provided and can bias the piston towards the unactuated position, so as to keep the piston in the unactuated position when the vehicle 4 is not incurring a collision event. In the closed position, the control valve prevents fluid flow to the cylinder thereby preventing actuation of the cylinder. In the open position the control valve permits fluid flow from the source of pressurized fluid to the cylinder to drive the piston to the actuated position. The source of pressurized fluid may simply be a vessel containing any suitable fluid, such as, for example, compressed Carbon Dioxide at a suitable pressure, such as, for example 2000 psi. In this embodiment, the control valve may be referred to as a release member that is controllable to expose the piston to the pressurized fluid. In another embodiment, the source of pressurized fluid may be an inflation device that is similar to an airbag inflation device, and that includes an igniter and two combustible chemicals, such as Sodium Azide and Potassium Nitrate, which, when ignited by the igniter, generate Nitrogen at high pressure which can be used to drive the piston to the actuated position. In such an embodiment, a control valve would not be needed. However, a controller 121 controls the operation of the igniter. In such an embodiment, the igniter may be referred to as a release member that is controllable to expose the piston to the pressurized fluid.

Referring to FIGS. 10A, 10B, 11A, 11B, 12A, 12B, 13A, 13B, 14A, 14B, a further embodiment of the latch 100 with actuation mechanism 101 is shown. The actuation mechanism 101 can include the support plate 117 that can connect to the mounting plate 115 of the latch 100 and thereby can form part of the latch housing (not shown), as desired. It is recognized that in the embodiment of the latch 100 shown, the mounting plate 115 is connected to the support plate 117 via linkages 118, e.g. on either side of the mounting plate 115, such that the linkages 118 are connected by a hinge or pivot 120 at one end to the mounting plate 115 and at the other end via a hinge or pivot 122 to the support plate 117. The support plate 117 can be connected to the body (see FIG. 1A) via mounting holes 124.

Figure 12A:
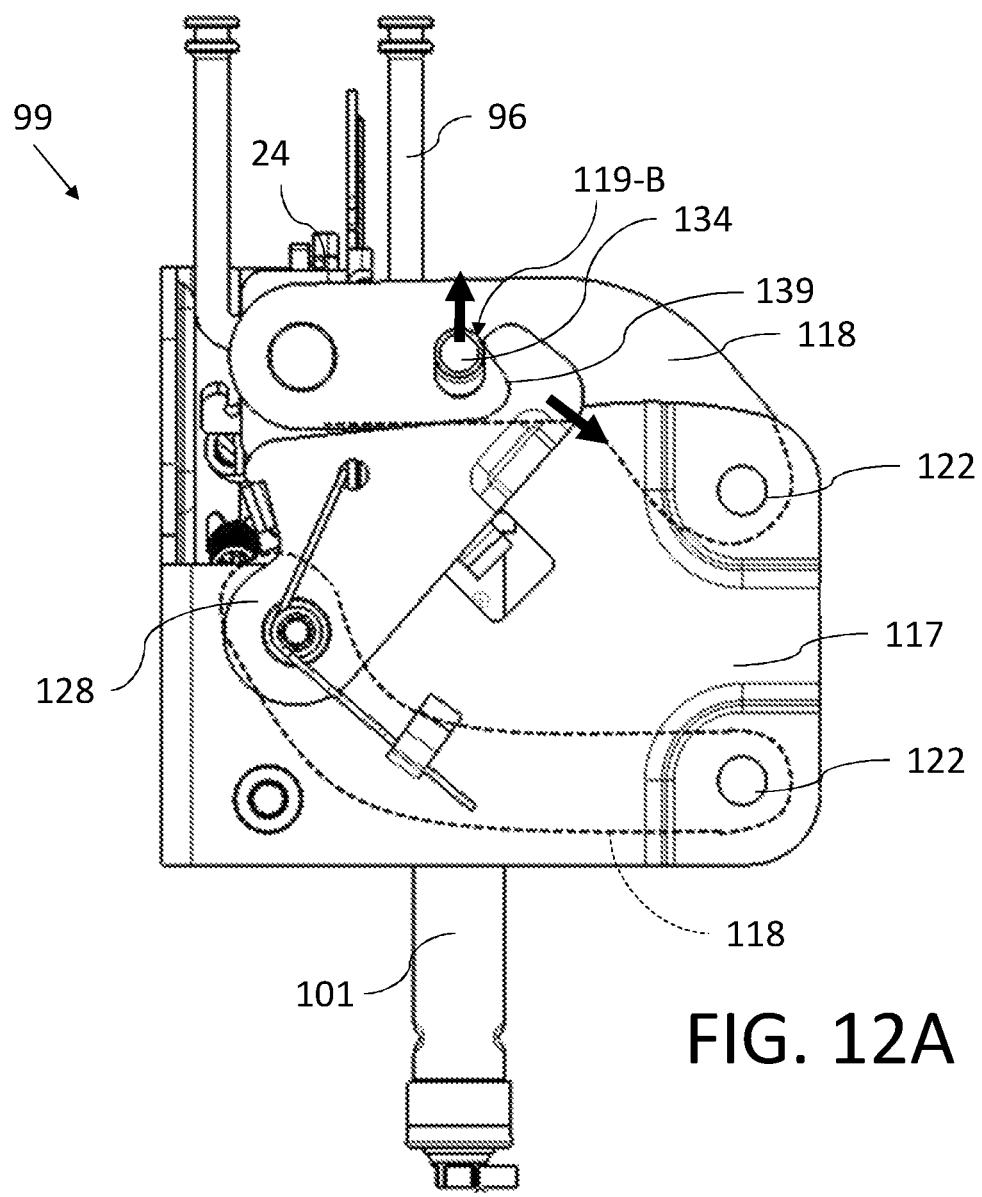
FIG. 12A is a side view of the actuation system shown in FIG. 10*a* in released while yet in the home position
Figure 12B:
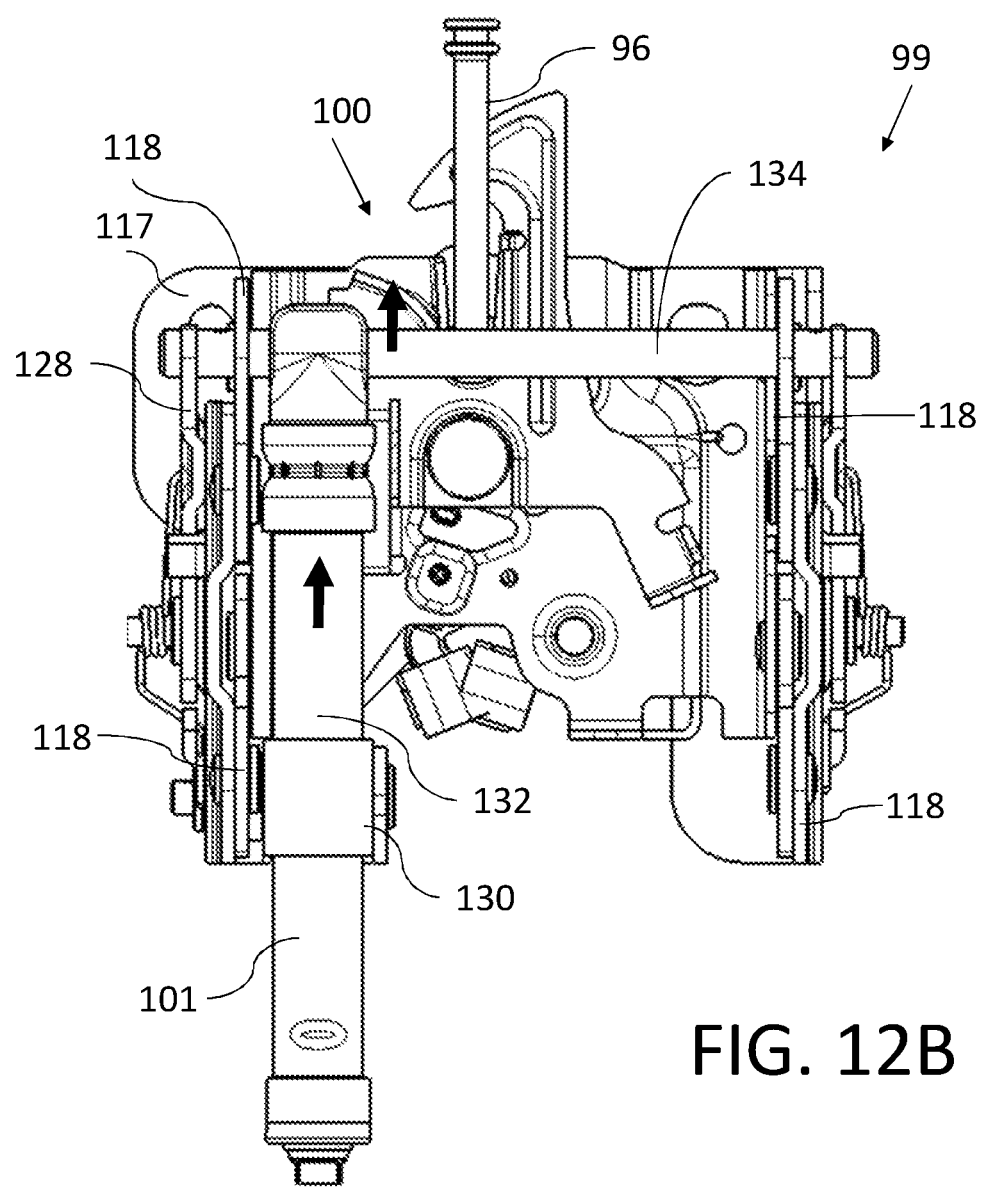
FIG. 12B is a front view of the actuation system shown in FIG. 10*a* in released while yet in the home position.
Figure 13A:
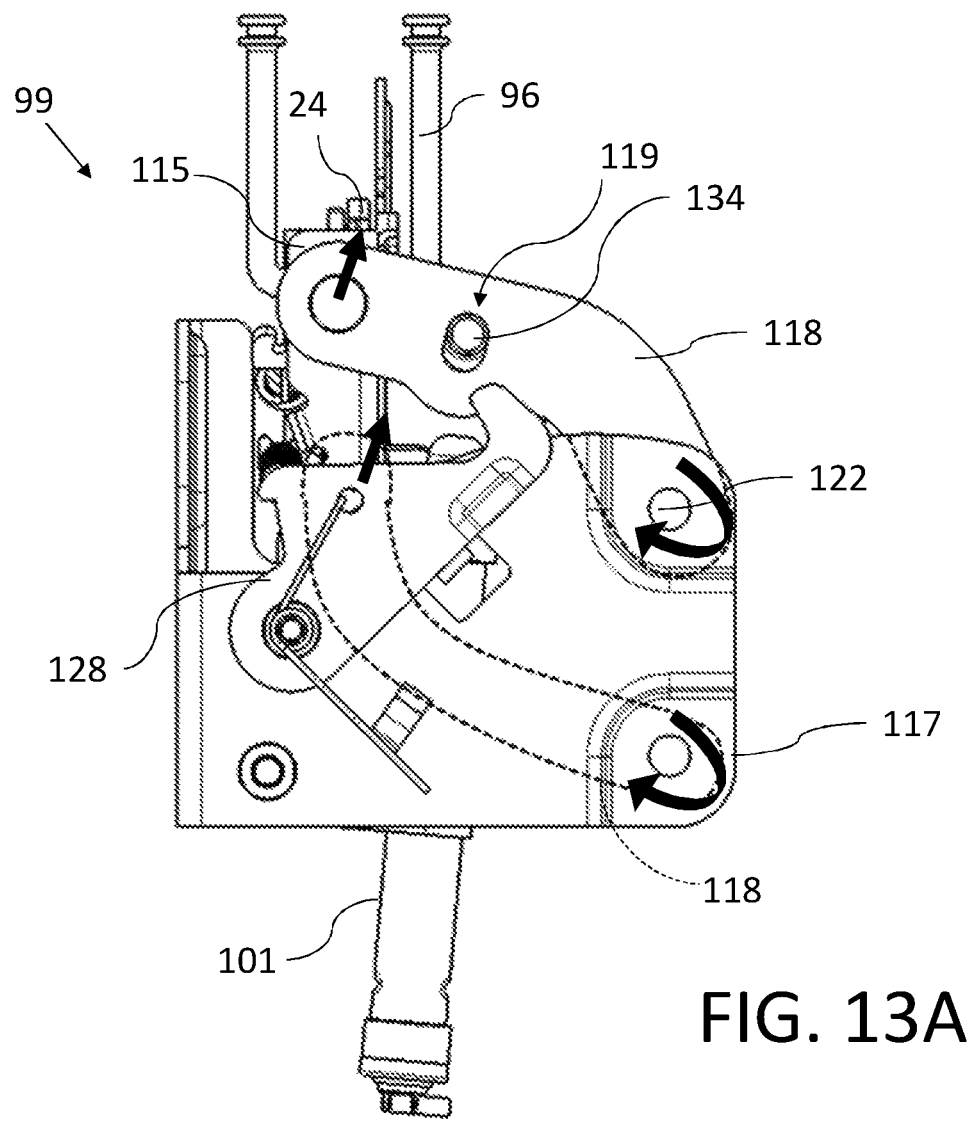
FIG. 13A is a side view of the actuation system shown in FIG. 10*a* in a partially extended position.
Figure 13B:
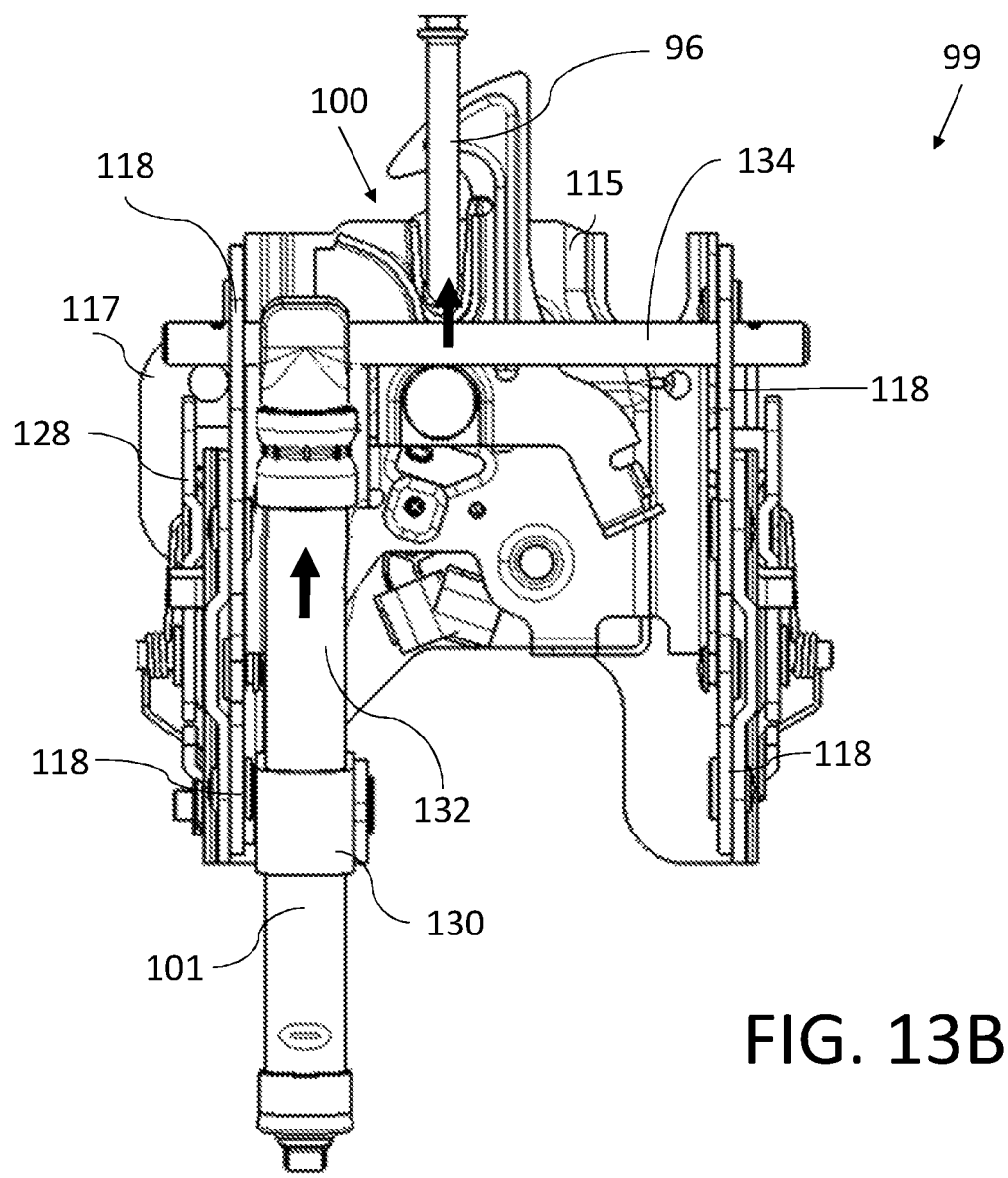
FIG. 13B is a front view of the actuation system shown in FIG. 10*a* in a partially extended position.
Figure 14A:
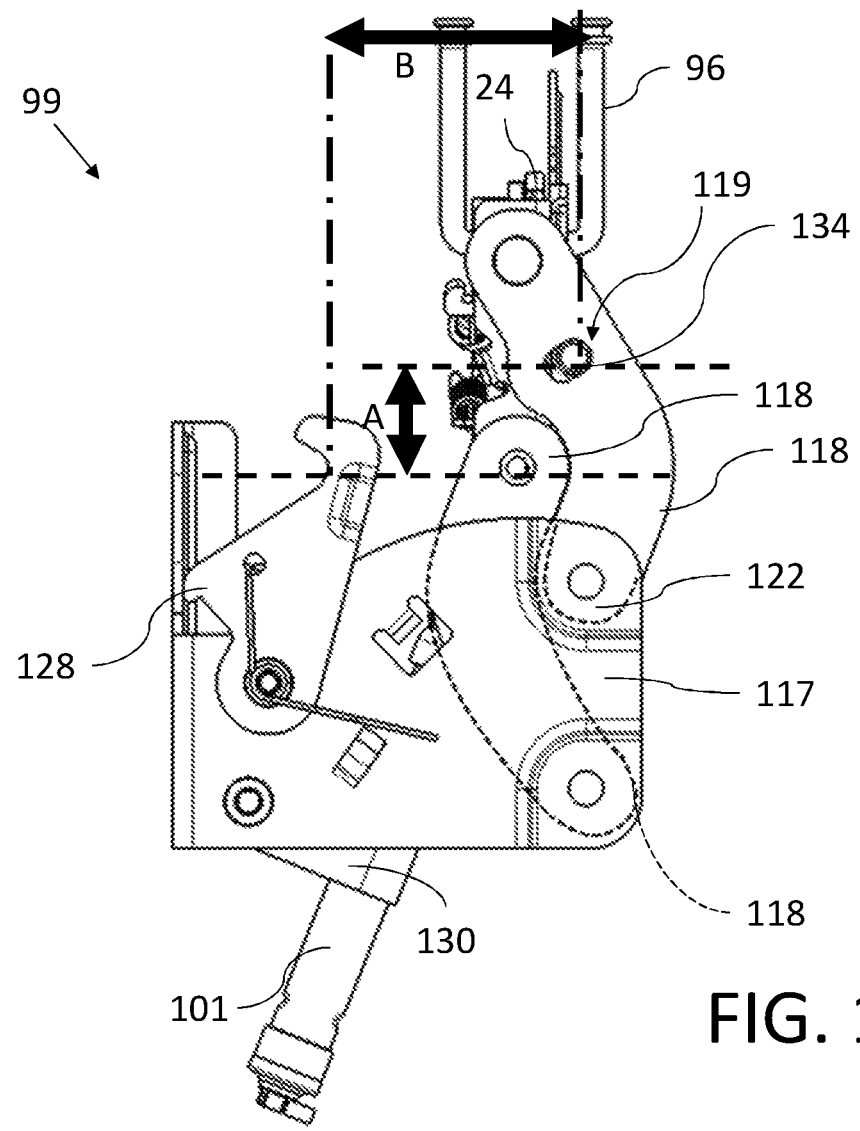
FIG. 14A is a side view of the actuation system shown in FIG. 10*a* in an extended position.
Figure 14B:
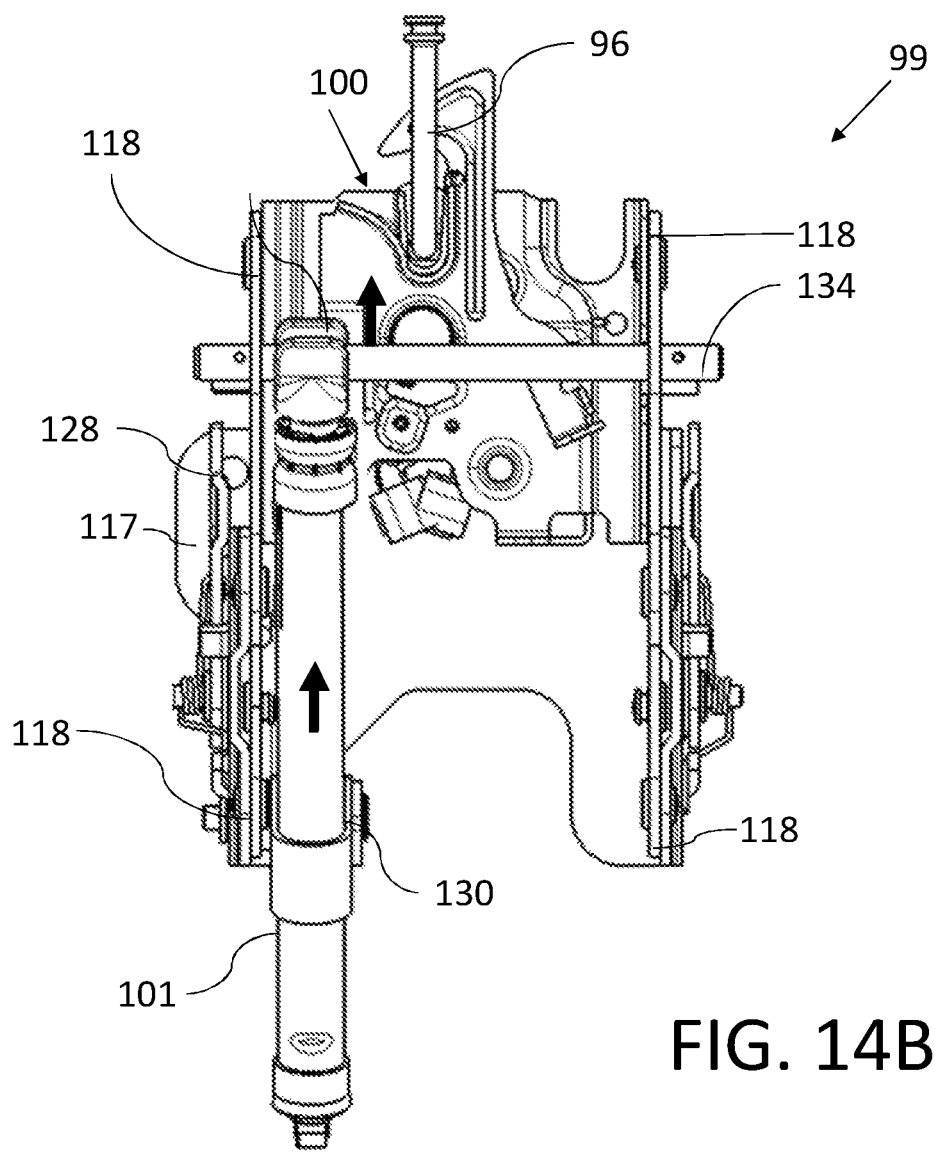
FIG. 14B is a front view of the actuation system shown in FIG. 10*a* in an extended position.

Referring again to FIG. 10a, the actuation mechanism 101 can be mounted on the body 5 (not shown) or on the support plate 117 itself, such that operation of the actuation mechanism 101 can be used to facilitate movement of the latch 100 from the home position (see FIG. 10A, 10B, 11A, 11B) to the extended position (see FIGS. 14A, 14B). The actuator mechanism 101 can have the housing 130 with actuation means (e.g. pyrotechnic) for extending and retracting the piston 132 (see FIG. 12b for example) for facilitating movement of the latch 100 (as well as mounting plate 115) between the home and extended positions. FIGS. 12A and 12B illustrates the piston 132 moving the actuator link 134 to the second slot end 119-B while latch is still in the latch 100 from the home position. FIGS. 13A and 13B illustrates the piston 132 moving the actuator link 134 to cause the linkages 118 to extend and thus move the latch 100 from the home position to a partially extended or deployed position, illustratively in an upwardly and aftwardly direction(s). FIGS. 14A and 14B illustrates the piston 132 having move the actuator link 134 to cause the linkages 118 to fully extend and thus move the latch 100 from the extended position.

Figure 10A:
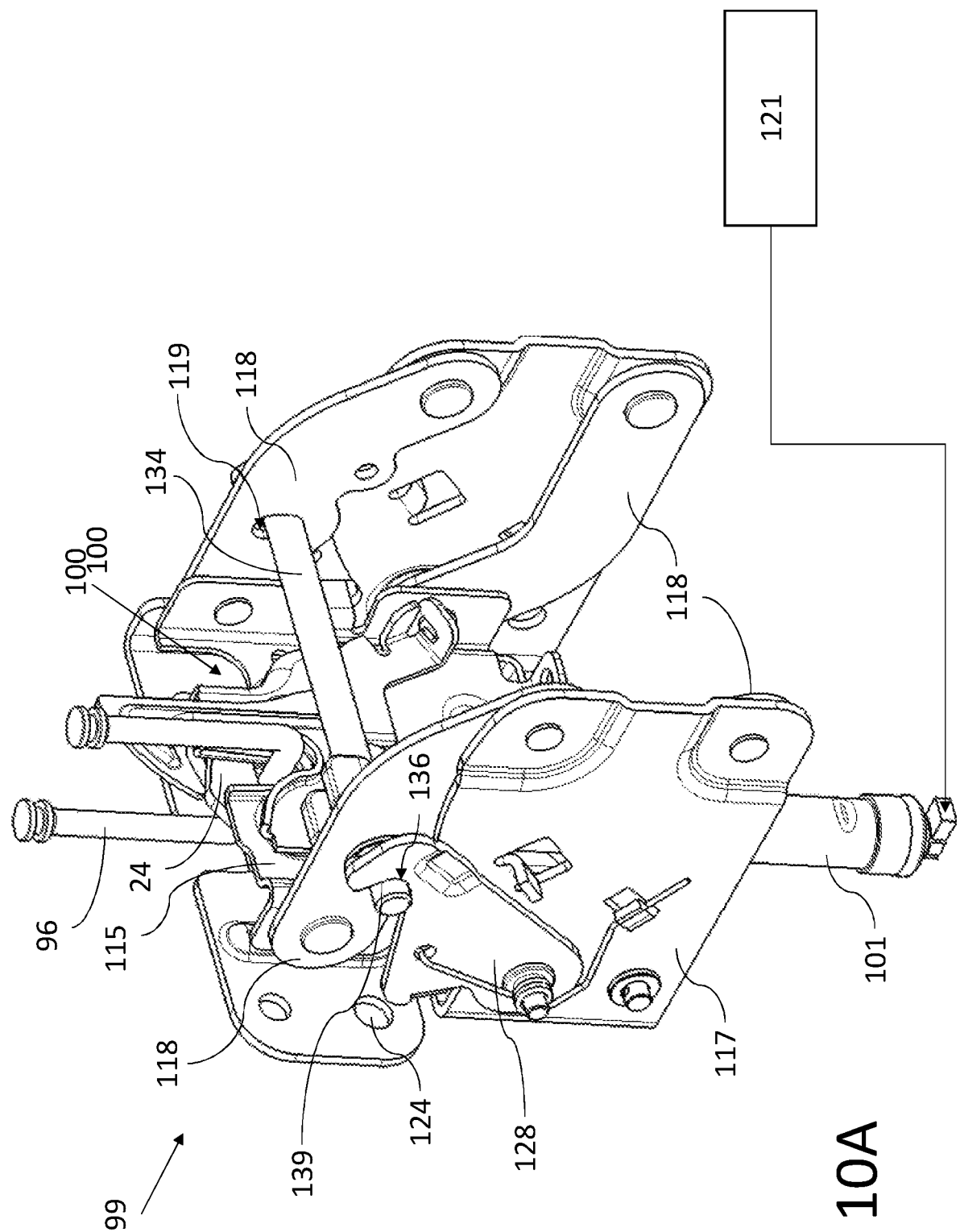
FIG. 10A is a front perspective view of a still further embodiment of the actuation system shown in FIG. 3.
Figure 10B:
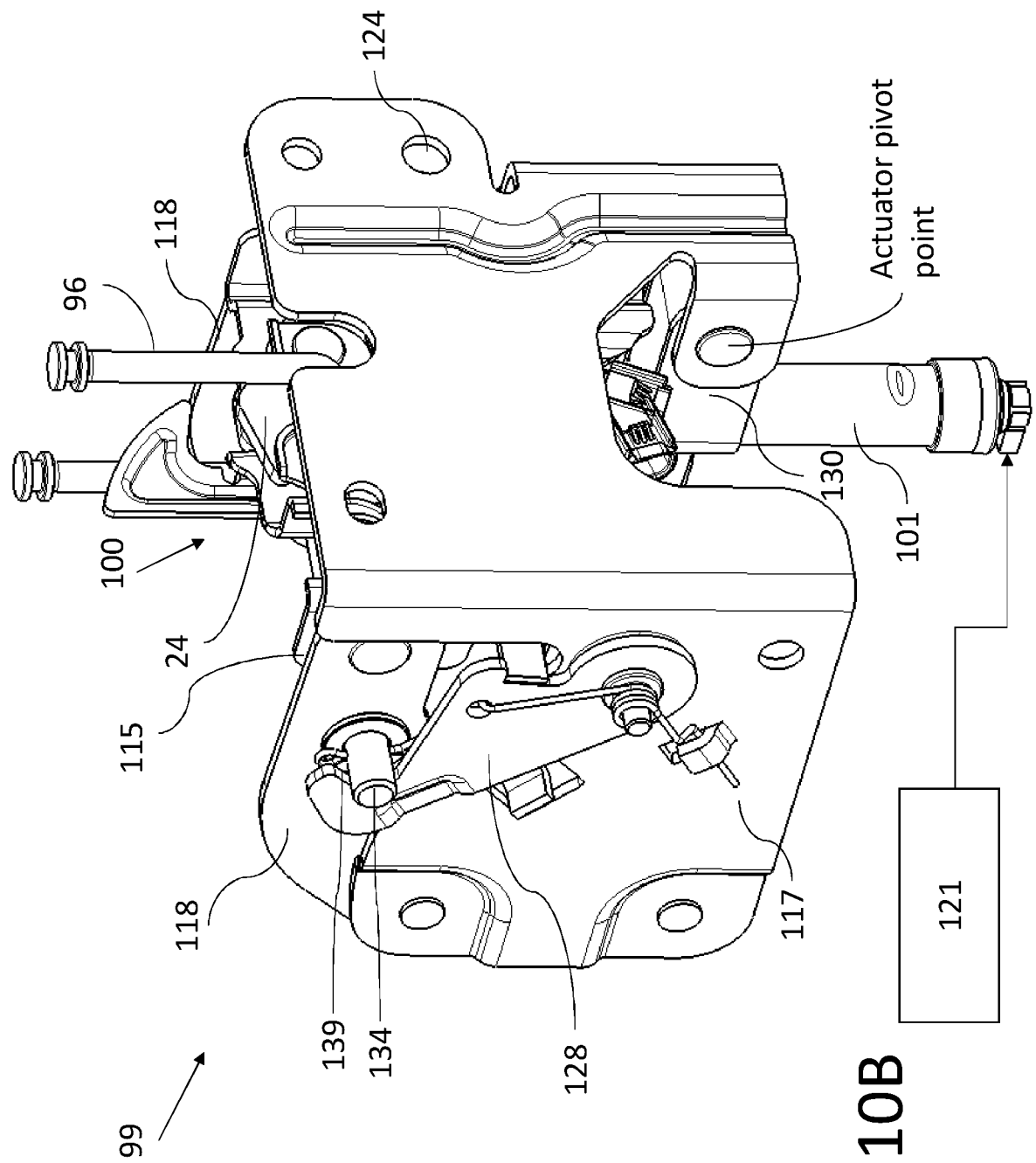
FIG. 10B is a rear perspective view of a still further embodiment of the actuation system shown in FIG. 3.
Figure 11A:
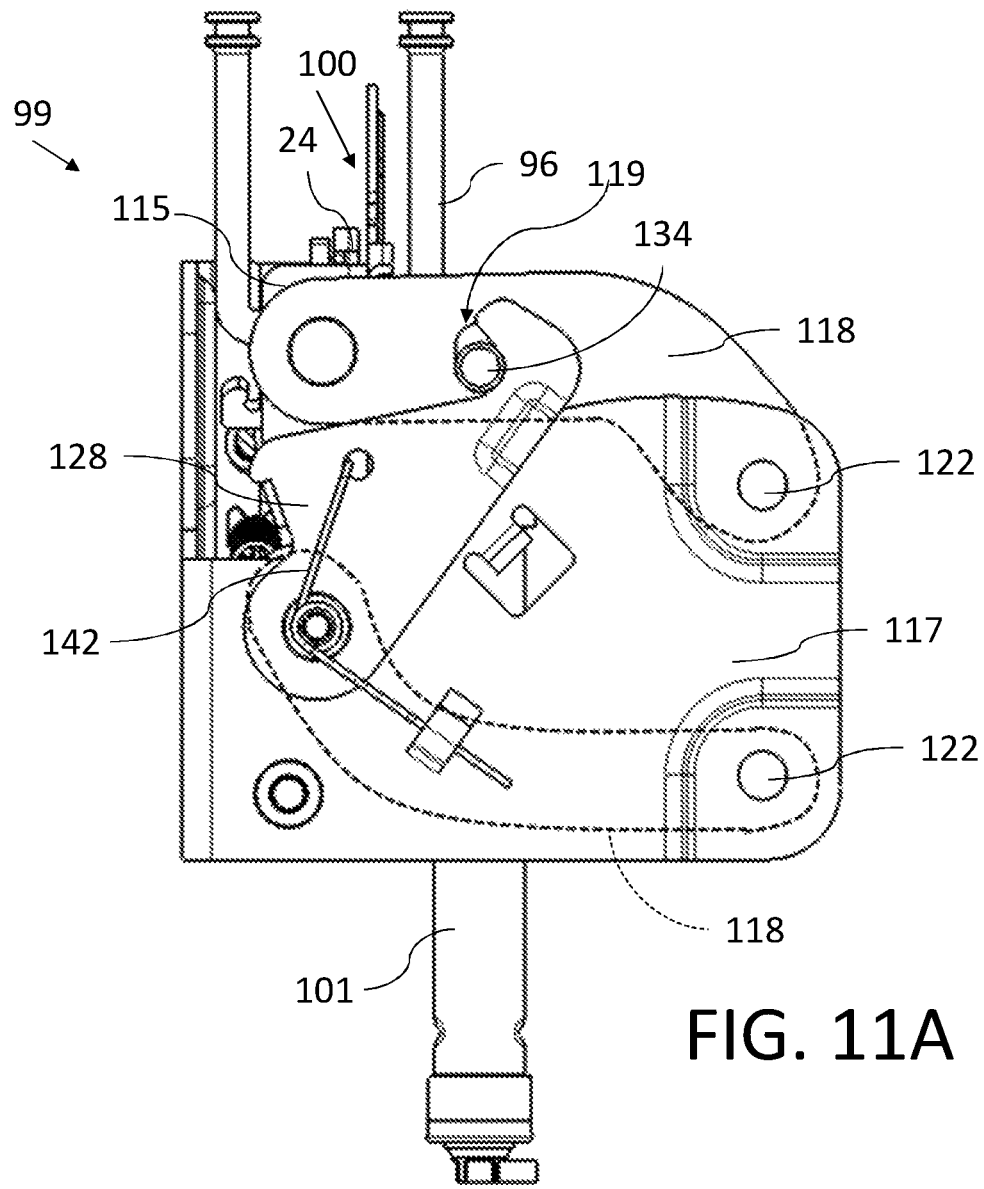
FIG. 11A is a side view of the actuation system shown in FIG. 10*a* in a home position.
Figure 11B:
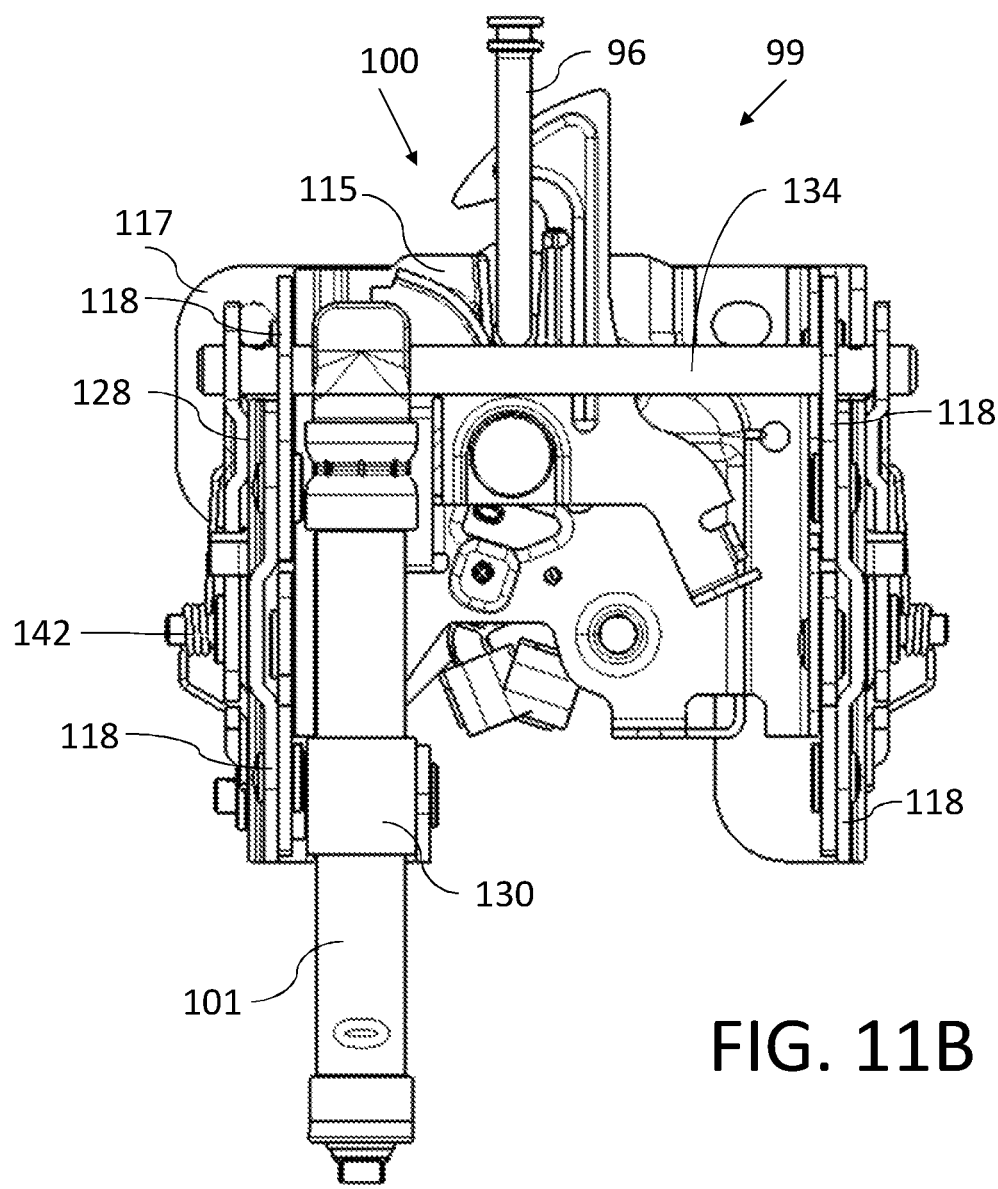
FIG. 11B is a front view of the actuation system shown in FIG. 10*a* in a home position.

Referring to FIGS. 10A and 14B, the piston 132 is coupled via a coupling member 148 (e.g. U-shaped member) mounted on the head of the piston 132 to the actuator link 134. As such, the piston 132 is coupled to the linkages 118, such that a force of the piston 132 on the actuator link 134 causes the linkages 118 to extend and thus move the latch 100 from the home position to the extended position. The actuator link 134 has abutting contact with the abutment member 148 to be able to therefore urge the linkages 118 into an upward motion as guided by the motion of the piston 132 during an additional travel of the actuator link 134. However, it is recognized that the actuator link 134 can be positioned on the latch 100, itself and/or the mounting plate 115 (for example) in order to provide for extension of the latch 100 when acted upon by the piston 132 (as driven by the actuator mechanism 101).

We claim:

1. A latch travel mechanism for a closure panel of a vehicle, the mechanism comprising:
   a mounting plate having a mount plane for mounting a latch, the latch for retaining a striker of the closure panel in order to latch the closure panel in a closed position with respect to a body of the vehicle;
   a support plate coupled to the mounting plate, the support plate for connecting to a body of the vehicle, the support plate having a support plane such that the mount plane and the support plane are opposed to one another when the mounting plate is in a home position;
   a pair of linkages having a first linkage and a second linkage;
   the first linkage connected to the support plate at a first end of the first linkage and connected to a link pivot at a second end of the first linkage;
   the second linkage connected to the link pivot at a first end of the second linkage and connected to the mounting plate at a second end of the second linkage, the pair of linkages coupling the support plate to the mounting plate, the pair of linkages having the link pivot connecting the pair of linkages to one another such that the link pivot is located between the first end of the first linkage and the second end of the second linkage, wherein the link pivot is positioned to a same side of both the support plane and the mount plane when the mounting plate is in the home position;
   an actuation system coupled to the pair of linkages for extending the pair of linkages, in order to move the mounting plate relative to the support plate from the home position to an extended position;
   wherein the latch is also moved from the home position to the extended position when mounted on the mounting plate.

2. The latch travel mechanism of claim 1 further including the latch mounted on the mounting plate as a latch travel assembly.

3. The latch travel mechanism of claim 2, wherein a mating latch component is retained in the latch by a ratchet when the support plate is moved from the home position to the extended position.

4. The latch travel mechanism of claim 1, further comprising a locking member mounted on the support plate and configured for retaining the mounting plate in the home position when coupled to the mounting plate and for decoupling from the mounting plate when operated, wherein the actuation system coupled to the pair of linkages for extending the pair of linkages once the locking member is decoupled from the mounting plate, in order to move the mounting plate relative to the support plate from the home position to the extended position.

5. The latch travel mechanism of claim 1, wherein moving of the mounting plate relative to the support plate includes a vertical travel distance and a horizontal travel distance.

6. The latch travel mechanism of claim 1, wherein the actuation system is mounted on the support plate.

7. The latch travel mechanism of claim 1 further comprising an actuator link connected to the pair of linkages, such that the actuation system acts against the actuator link in order to effect moving of the mounting plate relative to the support plate.

8. The latch travel mechanism of claim 7 further comprising a pre travel slot in the pair of linkages proving for the actuator link to move prior to movement of the pair of linkages as the actuation system is initially actuated.

9. The latch travel mechanism of claim 8, wherein a locking member includes a notch for engaging with the actuator link when the mounting plate is in the home position.

10. The latch travel mechanism of claim 9, wherein the moving of the actuator link by the actuation system disengages the notch from the actuator link.

11. The latch travel mechanism of claim 1 further comprising a locking member pivotally mounted to the support plate about a pivot.

12. The latch travel mechanism of claim 11 further comprising an actuator link connected to the pair of linkages, such that the actuation system acts against the actuator link in order to effect moving of the mounting plate relative to the support plate.

13. The latch travel mechanism of claim 12, wherein the locking member includes a notch for engaging with the actuator link when the mounting plate is in the home position.

14. The latch travel mechanism of claim 13, wherein movement of the actuator link by the actuation system disengages the notch from the actuator link.

15. The latch travel mechanism of claim 1 further comprising the step of releasing a locking member by the operating prior to moving of the mounting plate relative to the support plate.

16. A method for operating a latch travel mechanism coupled to a closure panel of a vehicle, the method comprising the steps of:
- retaining a mounting plate in a home position by a locking member, the mounting plate having a latch mounted thereon for retaining a striker of the closure panel in order to latch the closure panel in a closed position with respect to a body of the vehicle, the mounting plate coupled by a pair of linkages to a support plate connected to the body of the vehicle, the pair of linkages having a first linkage and a second linkage, the mounting plate having a mount plane and the support plate having a support plane such that the mount plane and the support plane are opposed to one another when the mounting plate is in the home position, the pair of linkages having a link pivot connecting the pair of linkages to one another such that the link pivot is located between an end of the first linkage connected to the support plate and an end of the second linkage connected to the mounting plate, wherein the link pivot is positioned to a same side of both the support plane and the mount plane when the mounting plate is in the home position;
- releasing the locking member in order to unlock the mounting plate from the support plate, the locking member retaining the mounting plate in the home position when coupled to the mounting plate and decoupling from the mounting plate when released;
- operating an actuation system in order to move the mounting plate relative to the support plate from the home position to an extended position;
- wherein the latch is also moved from the home position to the extended position as mounted on the mounting plate.

17. The method of claim 16, wherein a mating latch component is retained in a ratchet of the latch as the latch is moved from the home position to the extended position.

18. An active pedestrian system comprising:
- a closure panel of a vehicle comprising a striker,
- a latch travel mechanism for the closure panel, the mechanism comprising:
- a mounting plate having a mount plane for mounting a latch, the latch comprising a ratchet for slidably retaining the striker, the latch for retaining the striker of the closure panel in order to latch the closure panel in a closed position with respect to a body of the vehicle, a support plate coupled to the mounting plate, the support plate for connecting to a body of the vehicle, the support plate having a support plane such that the mount plane and the support plane are opposed to one another when the mounting plate is in a home position;
- a pair of linkages having a first linkage and a second linkage;
- the first linkage connected to the support plate at a first end of the first linkage and connected to a link pivot at a second end of the first linkage;
- the second linkage connected to the link pivot at a first end of the second linkage and connected to the mounting plate at a second end of the second linkage, the pair of linkages coupling the support plate to the mounting plate, the pair of linkages having the link pivot connecting the pair of linkages to one another such that the link pivot is located between the first end of the first linkage and the second end of the second linkage, wherein the link pivot is positioned to a same side of both the support plane and the mount plane when the mounting plate is in the home position;
- an actuation system coupled to the pair of linkages for extending the pair of linkages in order to move the mounting plate relative to the support plate from the home position to an extended position;
- wherein the latch is also moved from the home position to the extended position when mounted on the mounting plate, wherein the striker moves relative to the ratchet when the latch is moved.

* * * * *